US006584397B2

(12) United States Patent
Tanaka et al.

(10) Patent No.: US 6,584,397 B2
(45) Date of Patent: Jun. 24, 2003

(54) VEHICLE POSTURE CONTROL APPARATUS

(75) Inventors: Hirohisa Tanaka, Hyogo (JP); Toshio Yasutake, Kyogo (JP); Yoshihiro Watanabe, Hiroshima (JP); Jouji Nishioka, Hiroshima (JP)

(73) Assignees: Mazda Motor Corporation, Hiroshima (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/983,541

(22) Filed: Oct. 24, 2001

(65) Prior Publication Data

US 2002/0087247 A1 Jul. 4, 2002

(30) Foreign Application Priority Data

Oct. 24, 2000 (JP) ........................................ 2000-323580

(51) Int. Cl.⁷ .............................. G06F 7/00; B60T 8/24
(52) U.S. Cl. ............................. 701/70; 701/72; 701/82; 303/140
(58) Field of Search ............................. 701/70, 71, 72, 701/78, 82; 303/122.01, 138, 139, 140

(56) References Cited

U.S. PATENT DOCUMENTS

| 4,941,097 | A |   | 7/1990  | Karnopp et al.         |
|-----------|---|---|---------|------------------------|
| 5,141,069 | A |   | 8/1992  | Yasui                  |
| 5,261,503 | A |   | 11/1993 | Yasui                  |
| 5,313,389 | A |   | 5/1994  | Yasui                  |
| 5,341,297 | A |   | 8/1994  | Zomotor et al.         |
| 5,402,342 | A |   | 3/1995  | Ehret et al.           |
| 5,809,444 | A |   | 9/1998  | Hadeler et al.         |
| 5,893,896 | A |   | 4/1999  | Imamura et al.         |
| 6,155,655 | A |   | 12/2000 | Matsuno                |
| 6,199,001 | B1|   | 3/2001  | Ohta et al.            |
| 6,209,972 | B1|   | 4/2001  | Matsuno                |
| 6,438,474 | B1| * | 8/2002  | Tanaka et al. ...... 701/41 |

FOREIGN PATENT DOCUMENTS

| DE | 41 23 235    | 11/1992 |
|----|--------------|---------|
| DE | 44 46 582    | 6/1996  |
| DE | 196 38 430   | 4/1997  |
| DE | 197 53 145   | 6/1998  |
| DE | 101 09 580   | 8/2001  |
| JP | 07-223520 A  | 8/1995  |

OTHER PUBLICATIONS

Patent Abstracts of Japan Publication No. 2001–088673, "Behavior Controller for Vehicle" Publication Date: Apr. 3, 2001, Inventor: Wantanbe Yoshihiro.
Patent Abstracts of Japan Publication No. 2001–233195, "Device for Controlling Attitude of Vehicle" Publilcation Date: Aug. 28, 2001, Inventor: Nishizaki Katsutoshi et al.
Patent Abstracts of Japan Publication No. 2001–233230, "Vehicle Attitude Control Device" Publication Date: Aug. 28, 2001, Inventor: Nishizaki Katsutoshi et al.
Patent Abstracts of Japan Publication No. 2001–233229, "Vehicle Attitude Control Device" Publication Date: Aug. 28, 2001, Inventor: Nishizaki Katsutoshi et al.
European Search Report, patent application No. 01124361.5–2423 Dated: Mar. 1, 2002.

* cited by examiner

Primary Examiner—William A. Cuchlinski, Jr.
Assistant Examiner—Edward Pipala
(74) Attorney, Agent, or Firm—Nixon Peabody LLP; Donald R. Studebaker

(57) ABSTRACT

In a posture control apparatus controlling the posture of a vehicle in yawing direction by independently controlling brakes of the wheels, intervention of a first understeer control suppressing an understeering tendency is carried out when the understeering tendency of the vehicle is stronger than a preset reference value. Moreover, intervention of a second understeer control, in which the control amount is lower than in the first understeer control, is carried out when the actual yaw rate does not make a predetermined change with respect to a change of a steering wheel angle, thus improving the sense of stability and the controllability felt by the driver.

7 Claims, 16 Drawing Sheets

VEHICLE POSTURE CONTROL APPARATUS

BACKGROUND OF THE INVENTION

The present invention relates to the technological field of vehicle posture control apparatuses that avoid or suppress understeering tendencies (drifting out) and oversteering tendencies (spinning) by controlling the posture of a vehicle during cornering.

Conventionally, various vehicle posture control apparatuses are known, in which, such as in JP H06-183288A or JP H07-223520A, a target yaw rate is set based on the steering wheel angle and the vehicle speed, the actual yaw rate of the vehicle is detected with a yaw rate sensor, and when the deviation between the detected actual yaw rate and the target yaw rate has at least a predetermined value, an understeer control suppressing an understeering tendency of the vehicle intervenes or an oversteer control suppressing an oversteering tendency of the vehicle intervenes.

More specifically, in such a posture control apparatus, understeer control intervenes when the target yaw rate is larger than a value obtained by adding a predetermined threshold to the actual yaw rate, whereas oversteer control intervenes when the actual yaw rate is larger than a value obtained by adding a predetermined threshold to the target yaw rate.

In this conventional posture control apparatus, too much understeer control tends to intervene when the threshold is small. When the understeer control intervenes too early, there is the problem that this intervention of control interferes with the operation of the driver, damaging the driving experience.

In order to rectify this, the threshold determining the intervention of the understeer control should be increased, so that an early intervention of the understeer control can be inhibited. However in that case, the control will intervene only when the understeering tendency of the vehicle is already too large. Moreover, when the control finally intervenes, a strong control intervenes abruptly. Therefore, even though it is possible to ensure the stability of the vehicle, in a situation in which the understeering tendency increases until the understeer control intervenes, the driver feels that the controllability worsens, leading to a sense of instability.

In posture control apparatuses in which, different from the above-described conventional posture control apparatus setting the target yaw rate based on the steering wheel angle, the target yaw rate is set based on the lateral acceleration of the vehicle, the interference of control can be avoided by setting the intervention threshold for judging about intervention of understeer control to a relatively large value. In such a posture control apparatus, the increase of the lateral acceleration is small when the steering wheel is turned in a situation in which the vehicle is traveling straight forward (steering start), and detection of this lateral acceleration is difficult, so that the understeer control hardly intervenes at all. Therefore, considering traveling along a cornering path for example, a weak understeering tendency cannot be suppressed at the beginning of the steering near the entrance into the cornering path. As a result, a small cornering radius R has to be taken near the exit of the cornering path, or a strong understeer control may intervene. As a result, the driver may feel that the controllability is poor, or may feel a sense of instability.

Also when the behavior of the vehicle has an oversteering tendency, when the posture of the vehicle does not change in response to a steering wheel operation, the driver may feel as if the vehicle tends to understeer. Also in this situation, in a posture control apparatus in which the target yaw rate is set based on the lateral acceleration, understeer control does not intervene because the behavior of the vehicle is not in an understeering tendency. As a result, the driver may feel that the controllability is poor, or may feel a sense of instability.

In view of these problems, it is an object of the present invention to ensure a high vehicle stability and to enhance the sense of stability and the controllability felt by the driver, by improving the understeer control in a posture control apparatus.

SUMMARY OF THE INVENTION

In order to achieve these objects, according to the present invention, when a vehicle has an understeering tendency, intervention of a first understeer control suppressing this understeer tendency is performed, and when the actual yaw rate does not make a predetermined change with respect to a change of a steering wheel angle, intervention of a second understeer control is performed.

More specifically, the subject matter of the present invention is a vehicle posture control apparatus provided with a control means for controlling posture of the vehicle in yawing direction by independently controlling brakes of the vehicle's wheels.

A special feature of the invention is that the control means carries out intervention of a first understeer control suppressing the understeering tendency when the understeering tendency of the vehicle is stronger than a preset reference value, and the control means carries out intervention of a second understeer control, in which the control amount is lower than in the first understeer control, when the actual yaw rate does not make a predetermined change with respect to a change of a steering wheel angle of the vehicle.

Thus, first, when the understeering tendency of the vehicle is stronger than a preset reference value, a first understeer control intervenes to suppress this understeering tendency. This sufficiently ensures the stability of the vehicle.

On the other hand, when the actual yaw rate does not make a predetermined change with respect to a change of a steering wheel angle of the vehicle, for example when the deviation between the change rate of the steering wheel angle and the change rate of the actual yaw rate is increasing, then the understeering tendency would increase if unchecked (initial understeering state). To avoid this, when the actual yaw rate does not make a predetermined change with respect to a change of a steering wheel angle, the initial understeering state and the understeering growth (that is, the increase of the understeering tendency) are both suppressed by intervention of the second understeer control. Furthermore, also when the posture of the vehicle does not change in response to the steering wheel angle even though the behavior of the vehicle is not in an understeering tendency, or in other words, when the driver feels that there is an understeering tendency, the feeling of the driver of being in an understeering tendency can be suppressed by intervention of the second understeer control. Thus, by intervention of the second understeer control, strong understeering tendencies can be prevented, and the sense of stability felt by the driver can be improved. In addition, the posture of the vehicle is changed in the direction intended by the driver, so that the controllability felt by the driver is improved.

Moreover, in the second understeer control, the control amount is lower than in the first understeer control.

Therefore, the driver will hardly feel when the second understeer control intervenes. Moreover, even though the posture of the vehicle changes slightly in response to the driver's steering due to the second understeer control, this posture change is not very large. Therefore, the driver feels as if the behavior of the vehicle follows the operation of the steering wheel, and feels the intervention of control even less. As a result, an awkward feeling of the driver is prevented, and the driving experience is improved.

Furthermore, when for example the understeering increases even though the second understeer control has intervened, and the understeering tendency becomes stronger than a preset reference value, then the first understeer control intervenes, replacing the second understeer control. That is to say, before the first understeer control intervenes, the second understeer control intervenes, so that the first understeer control, which has a strong control amount, does not intervene abruptly. As a result, the awkward feeling of the driver is largely rectified. Also, the second understeer control intervenes previously to intervention of the first understeer control, so that the play of the brakes is eliminated (for example, leading to a state in which the brake pads adhere to the disk rotor). Therefore, the responsiveness of the first understeer control is improved. Furthermore, due to the intervention of the second understeer control, a slight force acts on the vehicle in the yawing direction. In this situation, the understeering tendency is easily suppressed by intervention of the first understeer control. Consequently, an even higher stability of the vehicle can be ensured.

Thus, in the present invention, the second understeer control is provided separately from the first understeer control, so that while ensuring a high stability of the vehicle, the sense of stability and the controllability felt by the driver are improved.

It is preferable that the second understeer control supplies a brake pressure whose upper limit is a predetermined brake pressure that is set to be lower than the maximum brake pressure that can be supplied in the first understeer control.

Thus, the control amount during the second understeer control is lower than the control amount during the first understeer control. As a result, a second understeer control is achieved whose control intervention is not noticed by the driver, even while suppressing for example a weak understeering tendency.

It is preferable that the control means carries out intervention of the second understeer control when the steering wheel is turned from an orientation in which the vehicle is moving straight forward and the actual yaw rate does not make a predetermined change with respect to the change of the steering wheel angle when turning the steering wheel.

That is to say, when a sufficient yaw rate change with respect to the steering at the initial steering of the steering wheel is not attained, for example when the steering wheel is turned in a situation in which the vehicle is traveling straight forward, then intervention of the second understeer control is carried out. Thus, the necessary yaw rate with respect to the steering angle is attained, for example at beginning steering at the entrance into a cornering path. As a result, a situation can be avoided, in which a small cornering radius R must be taken near the exit of the cornering path. Thus, the vehicle behaves as intended by the driver, and the tracing properties with respect to a target cornering trace are improved.

Also when it is difficult to determine whether the vehicle has an understeering tendency, such as at the beginning of the steering with the steering wheel, the control intervention of the second understeer control can be carried out accurately, because the intervention judgment is based on the steering wheel angle and the actual yaw rate.

The conditions for stopping the second understeer control can be set for example as follows: After intervention of the second understeer control, the control means stops the second understeer control when a deviation between the change rate of the steering wheel angle and the change of the actual yaw rate has switched to a decreasing tendency.

That the deviation between change ratio of the steering wheel angle and the change ratio of the yaw rate switches to a decreasing tendency occurs when the position of the vehicle is changing in accordance with the steering wheel operation. Consequently, when the intervention of the second understeer control is continued, the posture of the vehicle changes more than the steering wheel angle. To avoid this, the second understeer control is stopped when the change of the actual yaw rate is close to the change of the steering wheel angle. Thus, the control does not become excessive, and an optimal second understeer control can be achieved.

It is preferable that the first understeer control controls the braking of a cornering inside rear wheel, and the second understeer control controls the braking of a cornering inside front wheel.

By letting the second understeer control control the braking of a cornering inside front wheel, which is very effective to suppress an understeering tendency, understeering tendencies can be suppressed reliably and fast.

It is preferable that the control means prohibits the intervention of the second understeer control when the vehicle has an oversteering tendency that is stronger than a preset reference value.

That is to say, when the vehicle has an understeering tendency and an oversteering tendency, for example when the vehicle drifts out while spinning, then the oversteering tendency has to be controlled first. And when the vehicle has an oversteering tendency that is stronger than a preset reference value, the intervention of the second understeer control is prohibited, so that an oversteer control suppressing the oversteering tendency is performed. This improves the stability of the vehicle even more.

It is preferable that, in a vehicle posture control apparatus performing second understeer control in addition to the first understeer control in this manner, the control means judges an understeering tendency of the vehicle with regard to the first understeer control, based on a deviation between a target yaw rate set based on lateral acceleration of the vehicle and the actual yaw rate of the vehicle.

This means, at the beginning of steering, for example when the steering wheel is turned in a situation in which the vehicle is traveling straight forward, the increase of the lateral acceleration of the vehicle is small, and moreover, the lateral acceleration is difficult to detect. Therefore, it becomes difficult to intervene with the first understeer control based on the lateral acceleration. To avoid this, a second understeer control, whose intervention is determined based on the steering wheel angle and the actual yaw rate, is provided separate from the first understeer control, thus making it possible to intervene with the second understeer control early on. Thus, weak understeering tendencies as well as situations in which the driver feels an understeering tendency are accurately suppressed. As a result, the tracing properties are improved, and the sense of stability and the controllability felt by the driver are improved.

Figure 7:
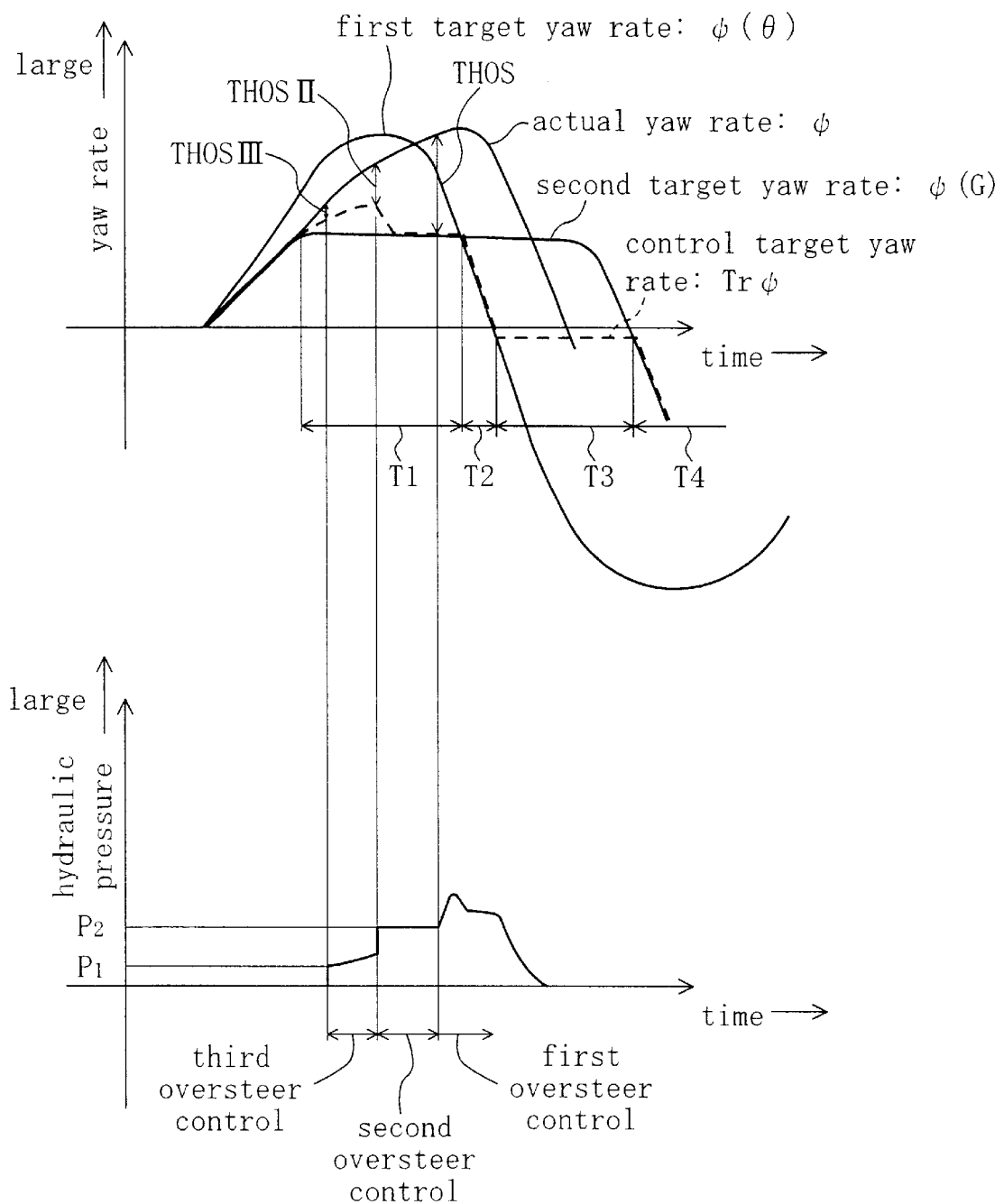

The upper diagram in FIG. 7 shows an example of the variation of the first target yaw rate, the second target yaw rate, the control target yaw rate and the actual yaw rate. The lower diagram in FIG. 7 shows an example of the brake pressure supply in the first to third oversteer control.

Figure 8:
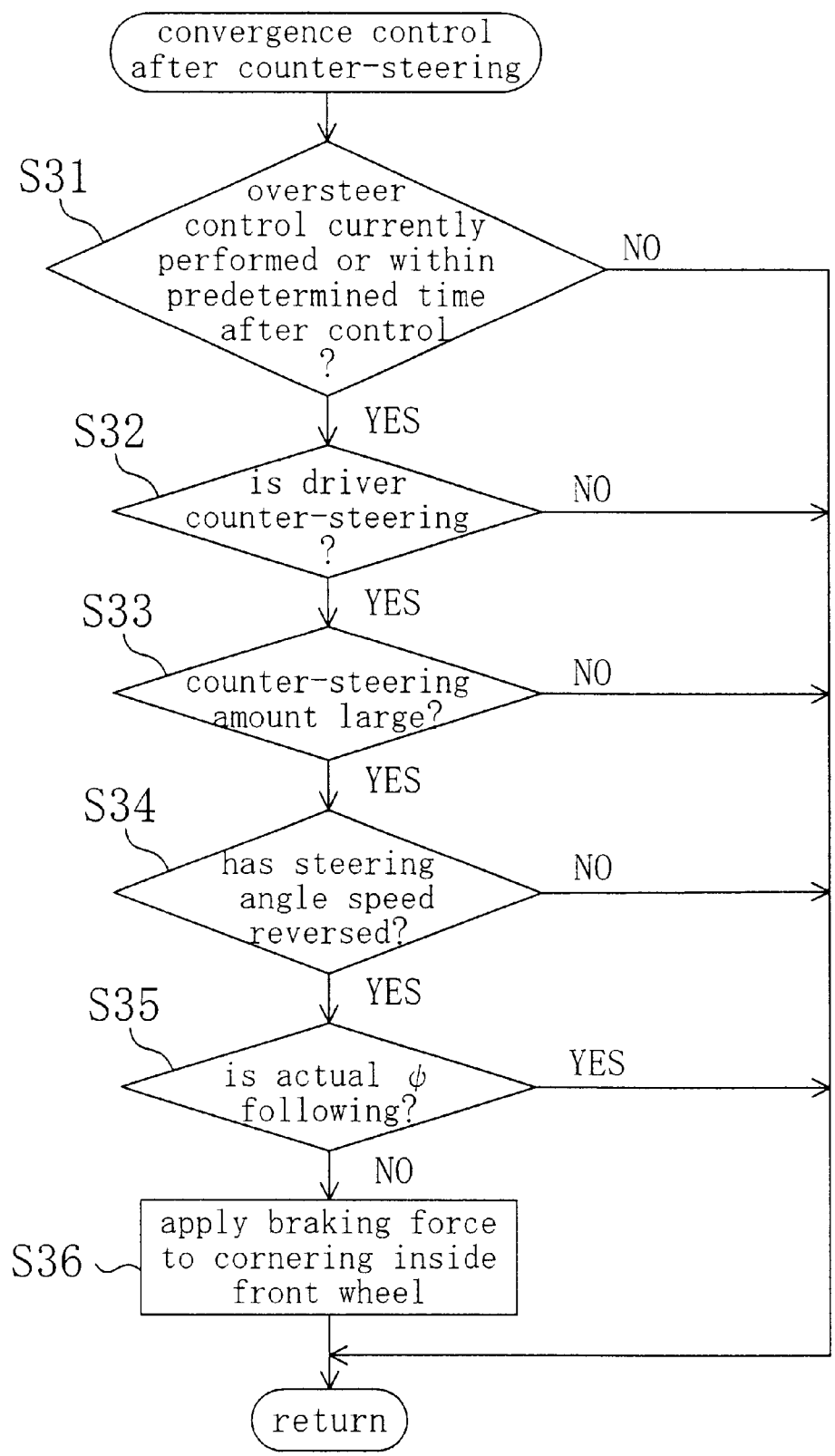

FIG. 8 is a flowchart illustrating the convergence control after counter-steering.

Figure 9:
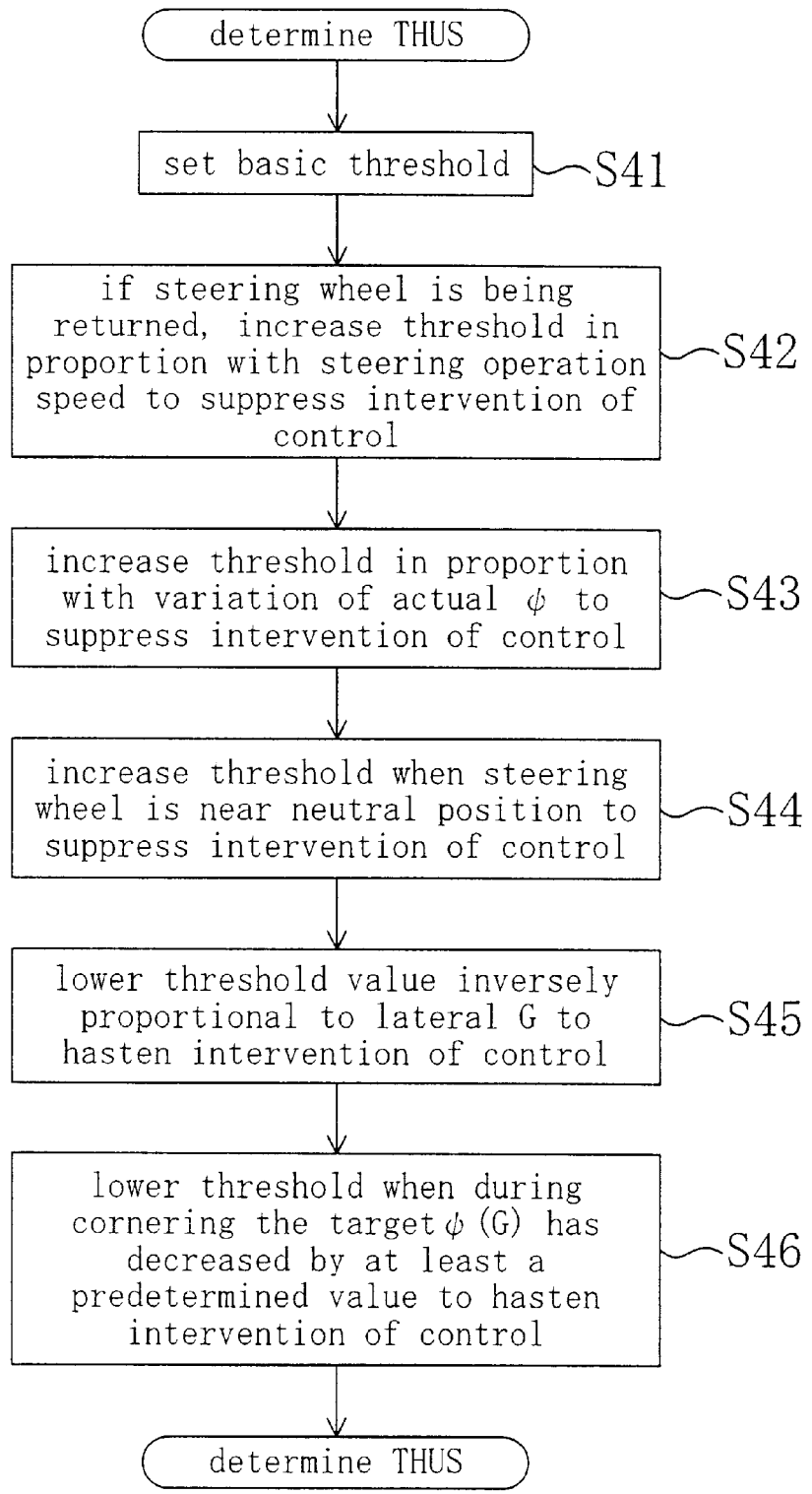

FIG. 9 is a flowchart for setting the threshold value of the first understeer control.

Figure 10:
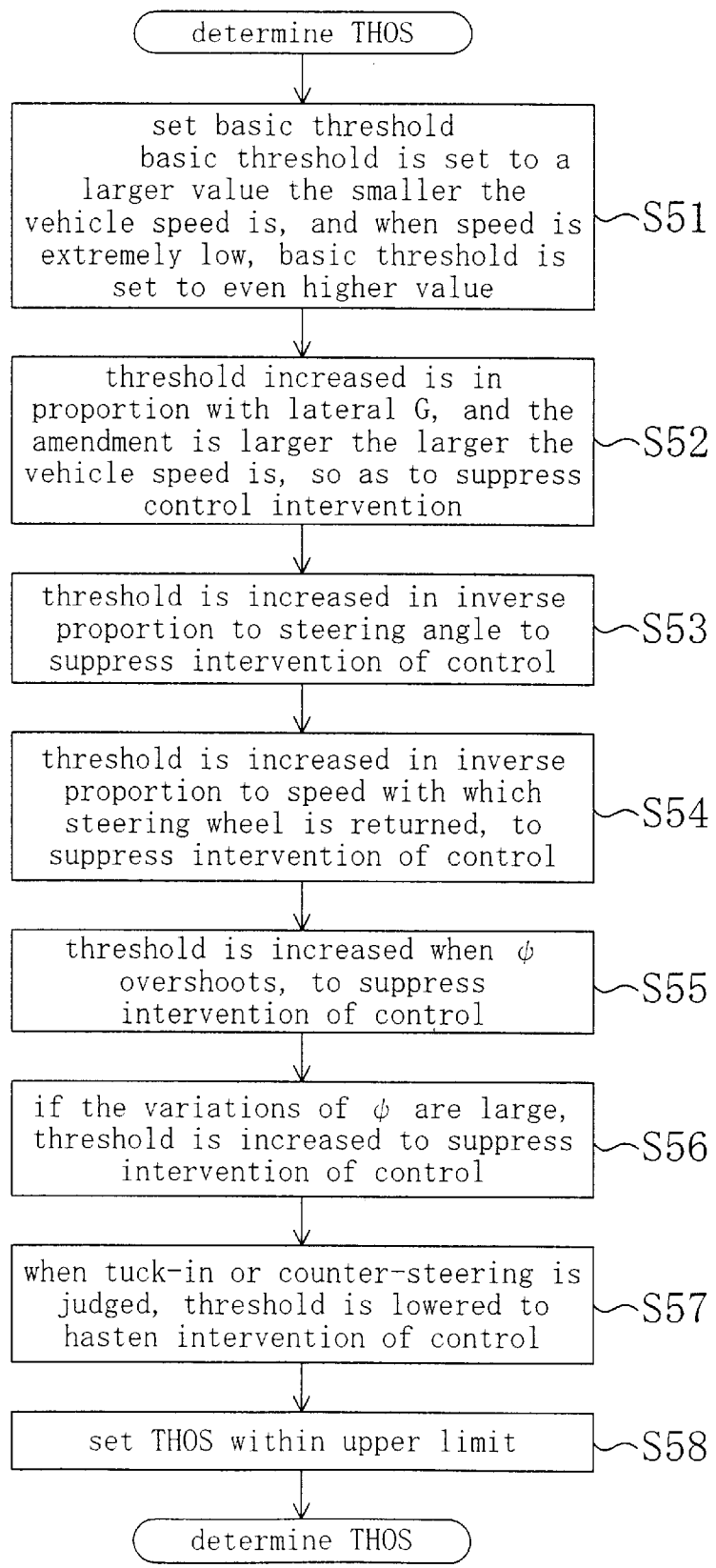

FIG. 10 is a flowchart for setting the threshold value of the first oversteer control.

Figure 11:
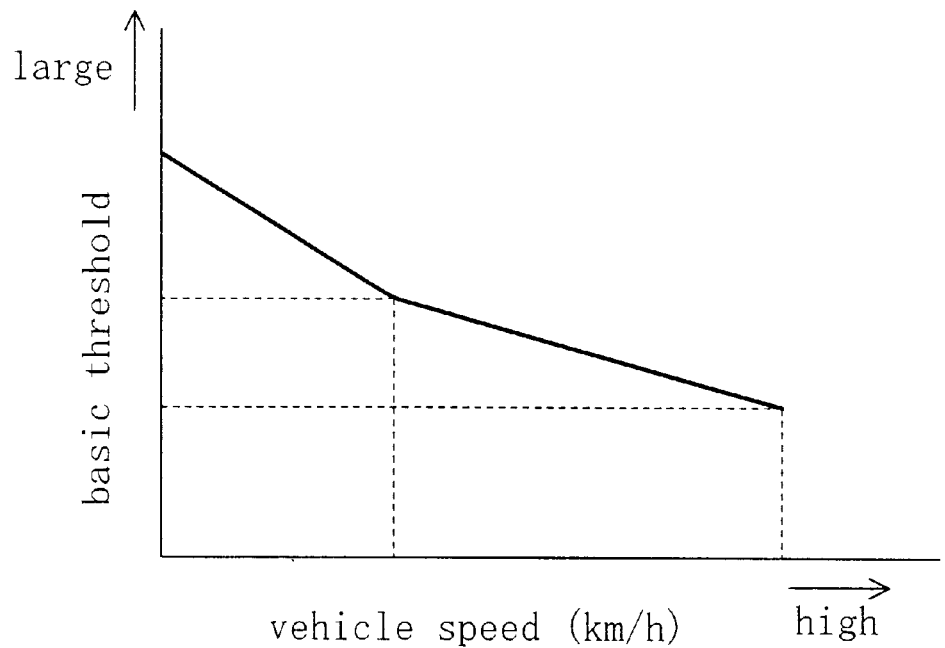

FIG. 11 illustrates the relation between the threshold of the first oversteer control and the vehicle speed.

Figure 12:
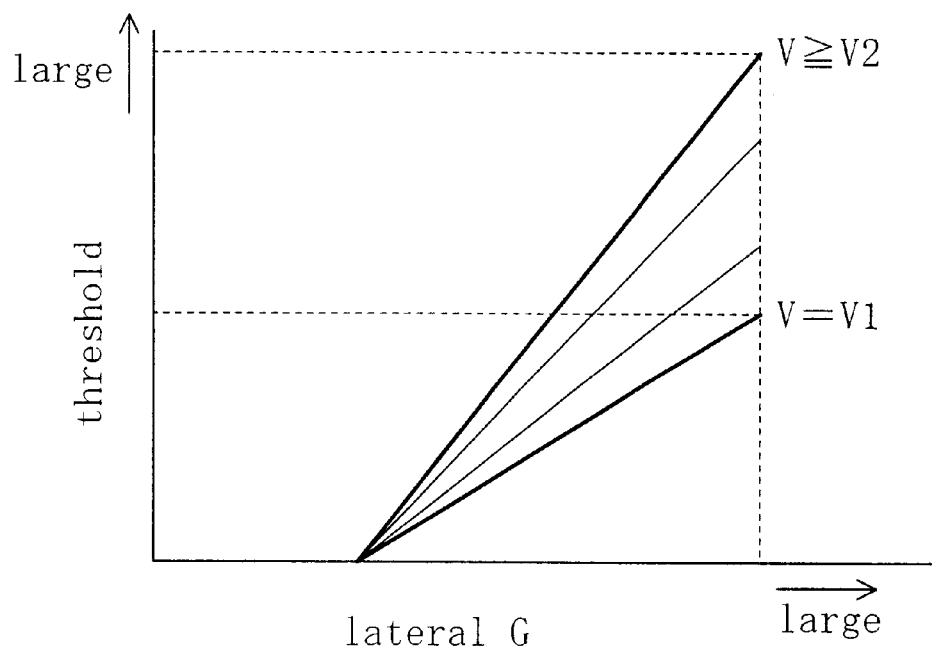

FIG. 12 illustrates the amendment to the threshold of the first oversteer control in accordance with the lateral acceleration and the vehicle speed.

Figure 13:
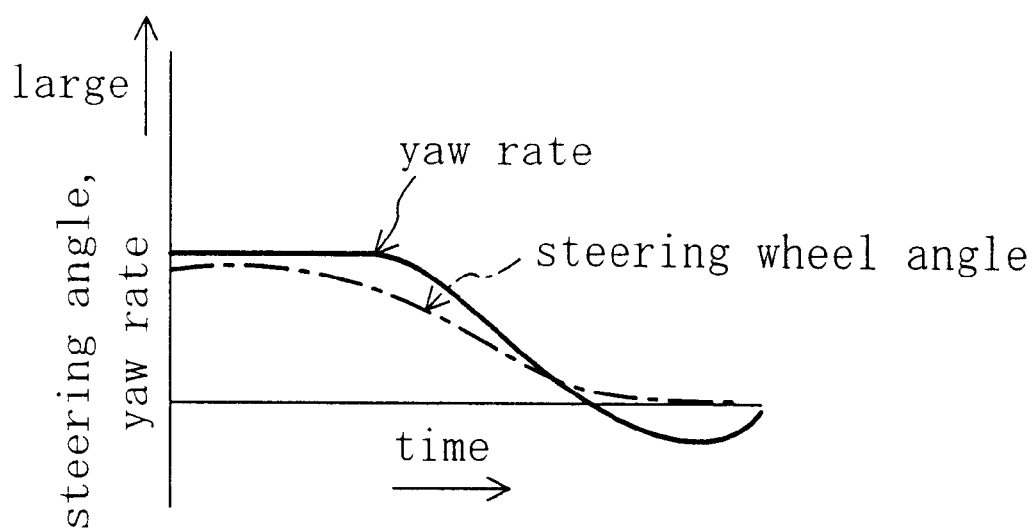

FIG. 13 illustrates the overshooting of the actual yaw rate.

Figure 14:
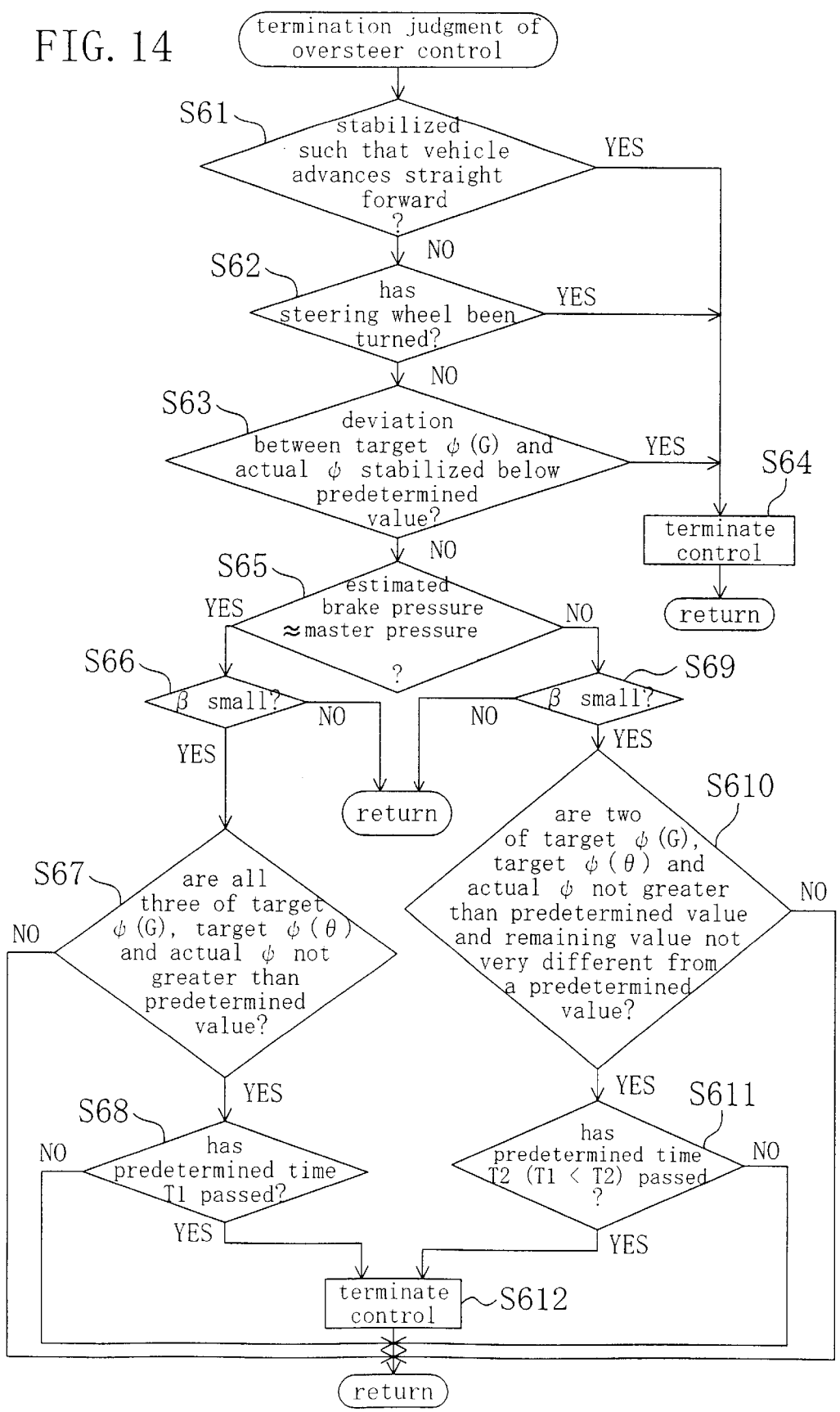

FIG. 14 is a flowchart illustrating the termination judgment of the first oversteer control.

Figure 15:
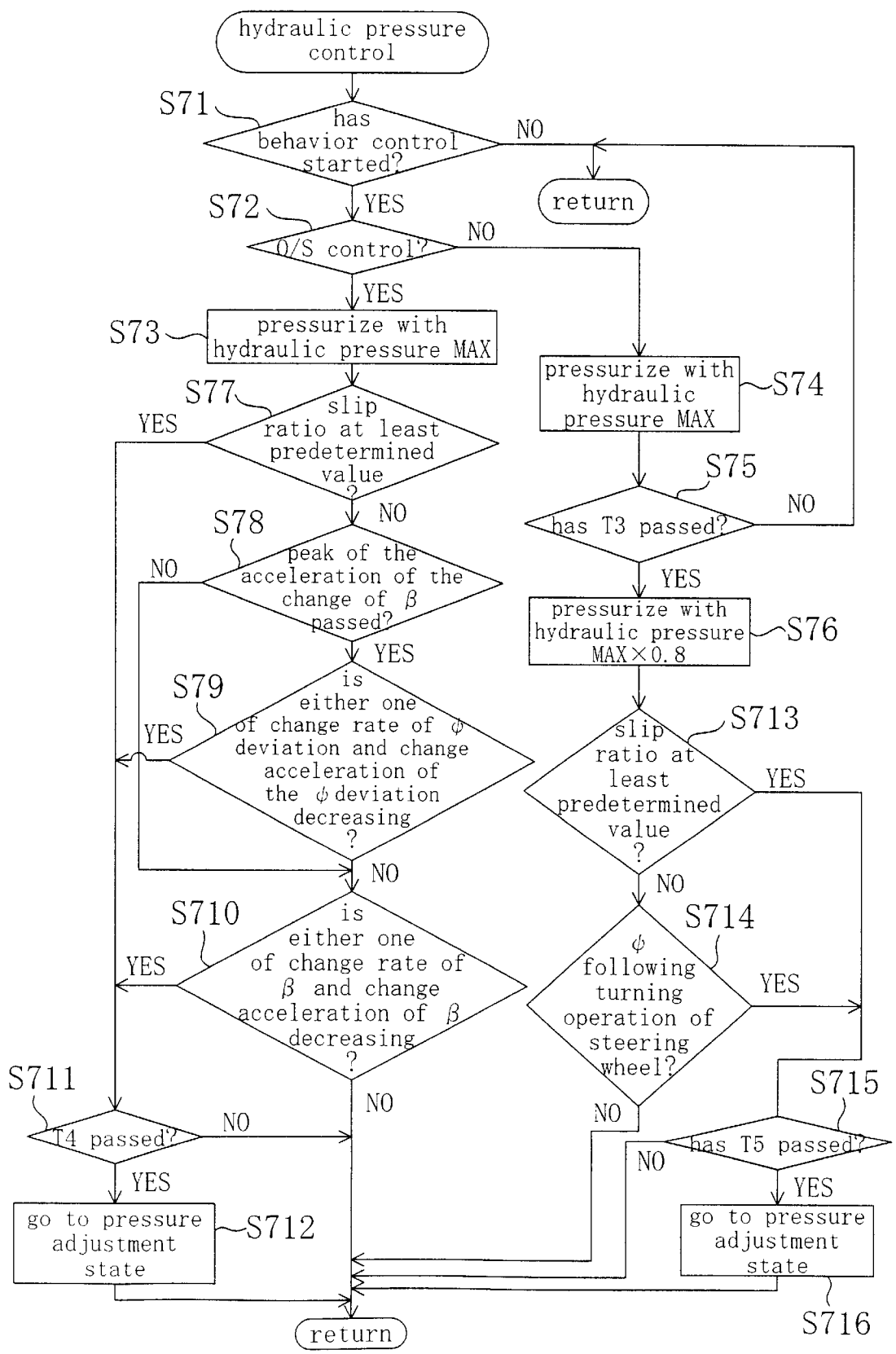

FIG. 15 is a flowchart illustrating the brake pressure control during the first oversteer control and understeer control.

Figure 16:
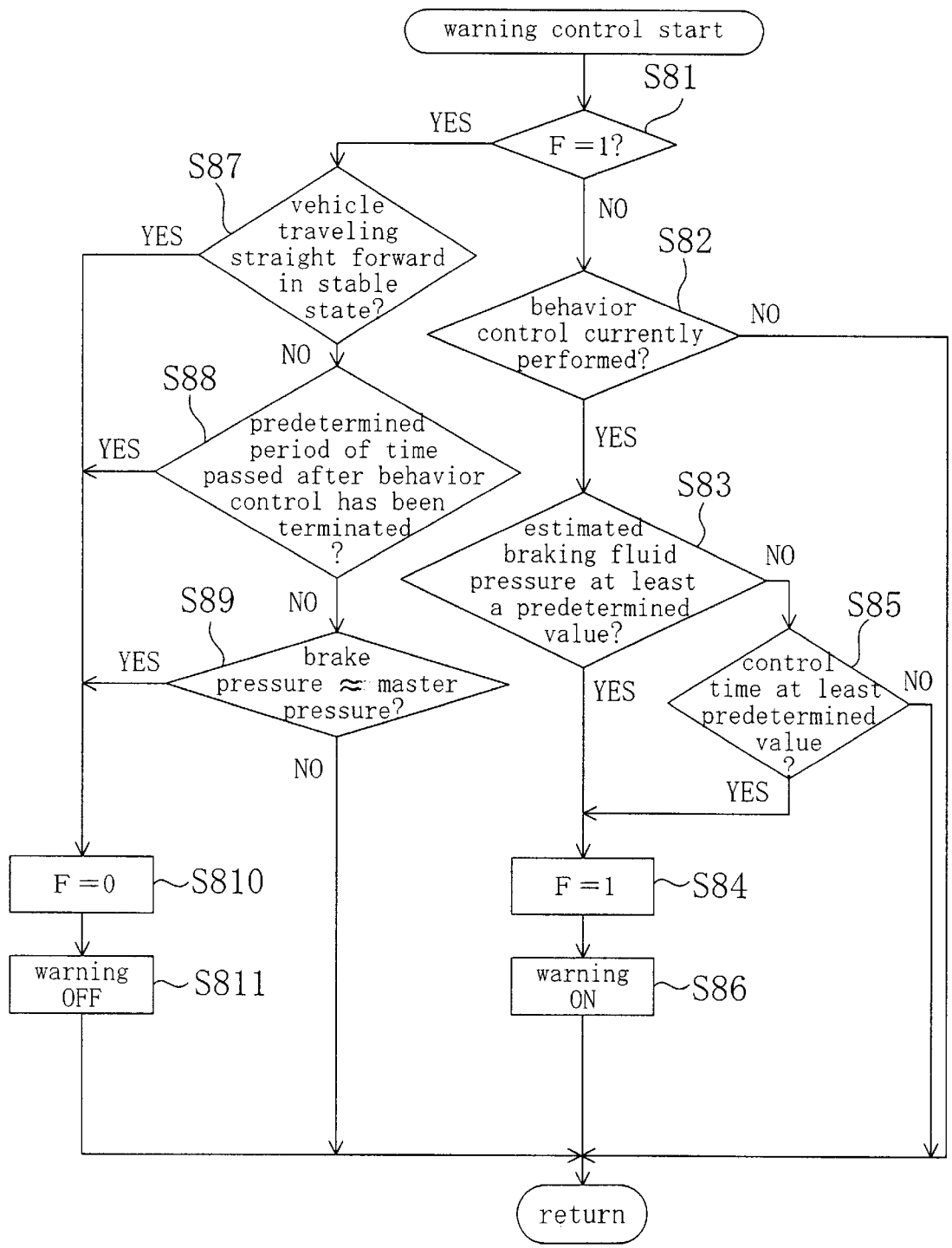

FIG. 16 is a flowchart illustrating the control of the warning apparatus.

DETAILED DESCRIPTION OF THE INVENTION

Figure 1:
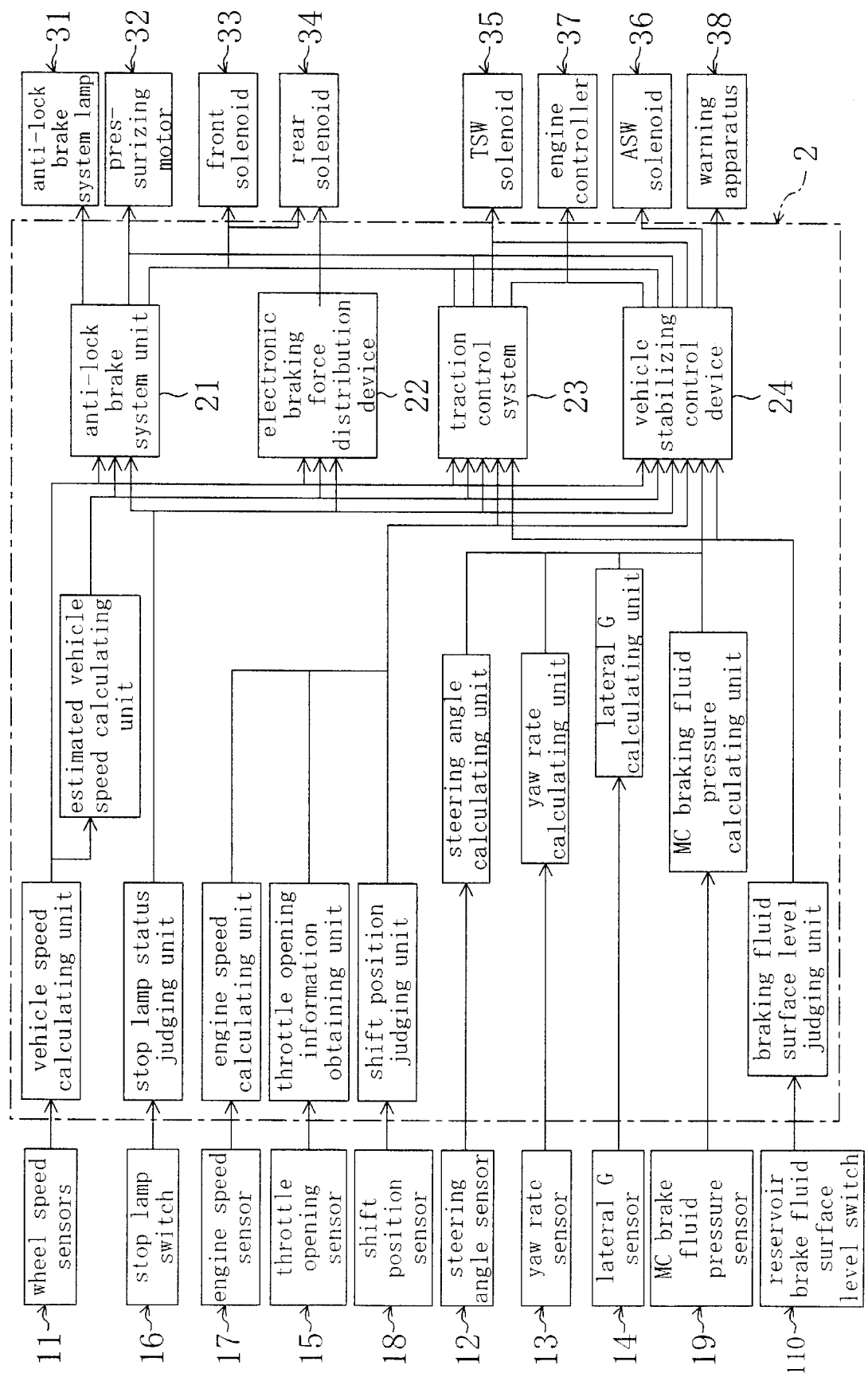
FIG. 1 is a block diagram showing a vehicle posture control apparatus.

FIG. 1 shows the overall configuration of a vehicle posture control apparatus in accordance with an embodiment of the present invention. First, the various devices on the input side shall be explained. Numeral 11 denotes wheel speed sensors detecting the speed of each wheel. Numeral 12 denotes a steering angle sensor detecting the steering angle of the steering wheel. Numeral 13 denotes a yaw rate sensor detecting the yaw rate of the vehicle. Numeral 14 denotes a lateral acceleration sensor (lateral G-sensor) detecting the acceleration of the vehicle in a lateral direction. Numeral 15 denotes a throttle opening sensor detecting the throttle opening. Numeral 16 denotes a stop lamp switch for canceling any control performed by the anti-lock brake system explained below. Numeral 17 denotes an engine speed sensor detecting the engine speed. This engine speed sensor 17 is provided in order to feedback control the engine output. Numeral 18 denotes a shift position sensor (AT) detecting the shift position to detect the driving state of the engine (power train). This shift position detection sensor 18 is also used as a cancel switch for canceling position control in case of reversing. Numeral 19 denotes an MC brake fluid pressure sensor detecting the brake fluid pressure of a master cylinder (MC). Depending on the detection result of this MC brake fluid sensor 19, the brake fluid pressure is supplemented by a hydraulic pressure corresponding to the force with which the driver pushes down the brake pedal. Numeral 110 denotes a reservoir brake fluid surface level switch detecting whether there is brake fluid in the reservoir.

Next, the various devices on the output side shall be explained. Numeral 31 denotes an anti-lock brake system lamp indicating whether the above-mentioned anti-lock brake system is operating. Numeral 32 denotes a pressurizing motor provided in a pressurizing pump. Numerals 33 and 34 respectively denote a front solenoid valve 33 and a rear solenoid valve 34 that are provided for the front wheels and the rear wheels, and that supply and draw away brake fluid to and from brake apparatuses made of disk brakes, for example. Numeral 35 denotes a TSW solenoid valve 35 that opens and cuts off a passage between the master cylinder and the brake apparatuses provided on each wheel. Numeral 36 denotes an ASW solenoid valve that opens and cuts off a passage between the master cylinder and the pressurizing pump mentioned above. Numeral 37 denotes an engine controller controlling the engine output. Numeral 38 denotes a warning apparatus serving as a warning means for informing the driver acoustically or visually when vehicle posture control is being performed.

The following is an explanation of an ECU 2 serving as a control means, into which signals from the above-mentioned input-side sensors and switches 11 to 110 are inputted, and which outputs control signals to the above-mentioned output-side devices 31 to 38, The ECU 2 includes an anti-lock brake system unit 21 for preventing locking of the wheels by controlling the braking force when the wheels are about to lock with respect to the road surface, an electronic braking force distribution device 22 that distributes the braking force applied to the rear wheels so as to keep the rear wheels from locking during braking, a traction control system 23 that prevents the wheels from slipping with respect to the road surface by controlling the driving force or the braking force applied to the wheels, and a vehicle stabilizing control device 24 that controls the posture of the vehicle in the yaw direction, that is, in a drift-out or spinning direction.

The following is an explanation of the input and output of the signals into and from the various devices. A wheel speed calculating unit and an estimated vehicle speed calculating unit calculate the wheel speed of each wheel and the estimated vehicle speed, based on signals received from the wheel speed sensors 11. The signal from the stop lamp switch 16 is inputted into a stop lamp status judging unit. The signals from the wheel speed calculating unit, the estimated vehicle speed calculating unit and the stop lamp status judging unit are inputted into the anti-lock brake system unit 21, the electronic braking force distribution device 22, the traction control system 23 and the vehicle stabilizing control device 24.

The signals from the engine speed sensor 17, the throttle opening sensor 15 and the shift position sensor 18 are respectively inputted into an engine speed calculating unit, a throttle opening information obtaining unit and a shift position judging unit, and from there into the traction control system 23 and the vehicle stabilizing control device 24.

The signals outputted by the steering angle sensor 12, the yaw rate sensor 13, the lateral G sensor 14, and the MC brake fluid pressure sensor 19 are respectively inputted into a steering angle calculating unit, a yaw rate calculating unit, a lateral G calculating unit and an MC brake fluid pressure calculating unit, and based on these signals, the calculating units calculate the steering angle, the yaw rate, the lateral acceleration, and the MC brake fluid pressure, which are then inputted into the vehicle stabilizing control device 24.

The signal from the reservoir brake fluid surface level switch 110 is inputted into the traction control system 23 and the vehicle stabilizing control device 24 via a brake fluid surface level judging unit.

The anti-lock brake system 21 calculates control values based on the inputted signals, and outputs signals to the anti-lock brake system lamp 31, the pressurizing motor 32, the front solenoid valve 33 and the rear solenoid valve 34 to control these components.

The electronic braking force distribution device 22 controls the rear solenoid valve 34.

The traction control system 23 outputs signals to the front solenoid valve 33, the rear solenoid valve 34, the pressurizing motor 32, the TSW solenoid valve 35, and the engine controller 37 to control these components.

The vehicle stabilizing control device 24 outputs signals to the engine controller 37, the front solenoid valve 33, the rear solenoid valve 34, the pressurizing motor 32, the TSW solenoid valve 35, the ASW solenoid valve 36, and the warning apparatus 38 to control the operation of these components.

Vehicle Posture Control

The following is an explanation of the vehicle posture control with the vehicle stabilizing control device 24. The vehicle stabilizing control device 24 performs understeer control, in which for example drifting out is avoided or suppressed, and oversteer control, in which for example spinning is avoided or suppressed. For understeer control, three control modes, namely a first understeer control, a second understeer control and engine control are provided, and also for the oversteer control, three control modes, namely a first, second and third oversteer control are provided.

The first understeer control is a relatively strong control (the posture change of the vehicle is relatively large), in which a braking force is applied to the front wheel situated on the inside of the turn (cornering inside front wheel) or the rear wheel situated on the inside of the turn (cornering inside rear wheel) when the deviation between a control target yaw rate Tr$\phi$ and the actual yaw rate $\phi$ is larger than a predetermined intervention threshold. In engine control, the engine output is lowered when the deviation between a control target yaw rate Tr$\phi$ and the actual yaw rate $\phi$ is larger than a predetermined intervention threshold. With these two types of control, the centrifugal force is lowered due to the decrease of vehicle speed, and a momentum acts on the vehicle due to the unbalance of the braking forces applied to the wheels. As a result, drifting out can be avoided or suppressed. By contrast, in the second understeer control, a braking force with a control amount that is smaller than for the first understeer control is applied on the cornering inside front wheel when the actual yaw rate does not undergo a predetermined change in response to a change of the steering wheel angle of the vehicle. Thus, it is possible to suppress relatively week understeering tendencies and the growth of understeering, and it is possible to keep the driver from feeling that the vehicle tends to understeer.

On the other hand, the first oversteer control is a relatively strong control, in which a braking force is applied to the front wheel situated on the outside of the turn (cornering outside front wheel) when the deviation between a control target yaw rate Tr$\phi$ and the actual yaw rate $\phi$ is larger than a predetermined intervention threshold. With this control, a momentum is generated that pushes the front of the vehicle outward with respect to the cornering direction, so that spinning can be avoided or suppressed. By contrast, in the second oversteer control, the control intervention threshold is smaller than the control intervention threshold of the first oversteer control, and in the third oversteer control, the control intervention threshold is even smaller than the control intervention threshold of the second oversteer control. Both the second and the third oversteer control are weaker than the first oversteer control (that is, the posture change of the vehicle is smaller). In the second oversteer control, brake pressure is supplied with open control in which a predetermined brake pressure is taken as an upper limit, whereas the third oversteer control is a feedback control, in which brake pressure is supplied depending on the deviation between the control target yaw rate Tr$\phi$ and the actual yaw rate $\phi$.

The following is a more detailed explanation of the posture control with the vehicle stabilizing control device 24, with reference to the flowchart in FIG. 2. First, in Step S11, signals are read in from the sensors and switches numbered 11 to 110.

In step S12, a first target yaw rate $\phi$ ($\theta$) is calculated in accordance with the steering angle, and a second target yaw rate $\phi$ (G) is calculated in accordance with in accordance with the lateral acceleration.

More specifically, the first target yaw rate $\phi$ ($\theta$) is calculated using Equation (1) below, using (a) the estimated vehicle speed V that has been calculated by the estimated vehicle speed calculating unit based on the signals outputted by the wheel speed sensors 11 and (b) the steering angle $\theta$ that has been detected by the steering angle sensor 12 and calculated by the steering angle calculating unit.

$$\phi(\theta)=V\times\theta/\{(1+K\times V^2)\times L\} \quad (1)$$

In Equation (1), K represents a stability factor for the vehicle, which is a constant that is determined from a cornering field on a high $\mu$ (friction factor) road. L is the wheelbase.

The second target yaw rate $\phi$ (G) is calculated with Equation (2) below, using the estimated vehicle speed V described above and the lateral acceleration Gy that has been calculated by the lateral G calculating unit based on the signal from the lateral G sensor 14.

$$\phi(G)=Gy/V \quad (2)$$

Next, in step S13, it is judged whether the absolute value of the second target yaw rate $\phi$ (G) is below the absolute value of the first target yaw rate $\phi$ ($\theta$). This judgment is performed as a step for deciding which of the first target yaw rate $\phi$ ($\theta$) and the second target yaw rate $\phi$ (G) should be set as the control target yaw rate Tr$\phi$. Out of the first and second target yaw rate $\phi$ ($\theta$, G), the one with the smaller absolute value is set as the target yaw rate Tr$\phi$.

When the judgment at Step S13 is "NO", then the procedure advances to Step S14, and when it is "YES", then the procedure advances to Step S15.

At Step S14, the first target yaw rate $\phi$ ($\theta$) is taken as the control target yaw rate Tr$\phi$ and the deviation $\Delta\phi$ ($\theta$) to the actual yaw rate $\phi$ detected with the yaw rate sensor 13 and calculated with the yaw rate calculating unit is calculated.

On the other hand, at Step S15, the second target yaw rate $\phi$ (G) is taken as the control target yaw rate Tr$\phi$. Herein, the control target yaw rate Tr$\phi$ is amended with a steering angle component, as shown in Equation (3):

$$Tr\phi=\phi(G)+a\times k1 \quad (3)$$

In Equation (3), a=φ (θ)−φ (G), and k1 is a variable.

Then, the deviation Δφ (θ, G) between this amended control target yaw rate Trφ and the actual yaw rate φ is calculated.

Thus, when the second target yaw rate φ (G) based on lateral acceleration is taken as the control target yaw rate Trφ, the amendment with the steering angle component makes it possible to suppress the intervention of posture control when the driver intentionally provokes an understeering tendency (so-called "intentional understeering").

This is to say, there are two kinds of understeer. Intentional understeering is intentionally caused by the driver in an operation where the driver keeps the steering wheel at a constant angle and simultaneously increases the driving force when the vehicle tends to understeer. Unintentional understeering is caused when the vehicle behavior cannot follow the driver's operation of the steering wheel. When the control target yaw rate Trφ is set using the second target yaw rate φ (G) that is based on the lateral acceleration, then the lateral acceleration on the vehicle is the same for both types of understeer. For that reason, posture control will also be performed for the above-described intentional understeering. In order to avoid this, the steering angle component is amended when the second target yaw rate φ (G) is taken as the control target yaw rate, so that posture control is performed only when the driver has turned the steering wheel. As a result, posture control is not controlled during intentional understeering, but only when the driver understeers intentionally.

Figure 3:
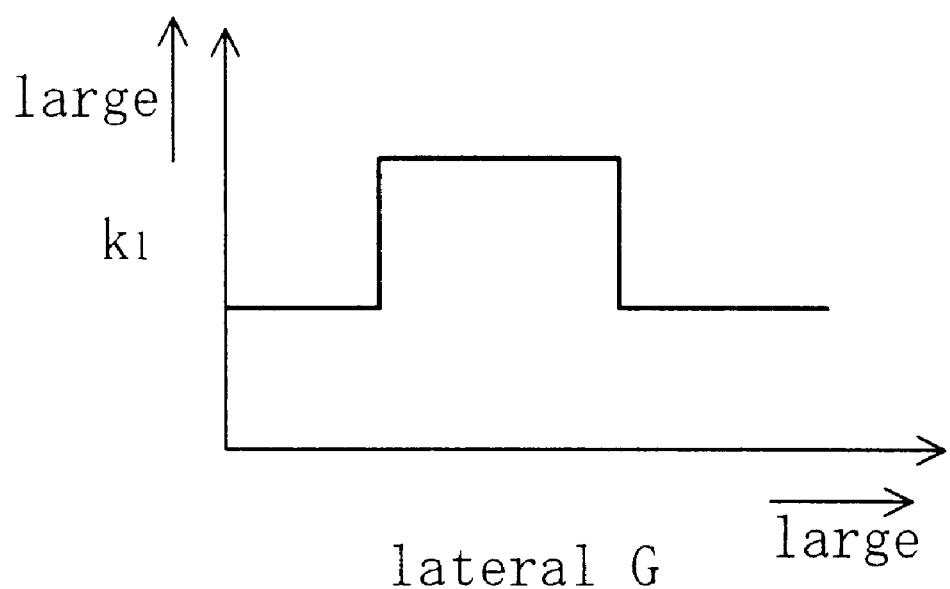
FIG. 3 is a graph showing the amendment factor k as a function of the lateral acceleration.

For k1 in Equation (3), a value is chosen that changes depending on the lateral acceleration, for example as shown in FIG. 3. That is to say, when the lateral acceleration is small (in regions where the road surface has a low $\mu$, such as on an icy surface) or when the lateral acceleration is large (in regions with a high $\mu$), a small value is chosen for k1, and the amendment ratio of the steering angle component is low.

The reason for this is that when a large k1 is chosen in regions with a low $\mu$ for example, the following problem occurs: In regions with low $\mu$, there tends to be a lesser response to turning the steering wheel, so that the driver usually turns the steering wheel at comparatively large steering angles. In this case, if the amendment ratio of the steering angle component is large because k1 has been set to a large value, then the deviation between the control target yaw rate Trφ and the actual yaw rate φ becomes large, and the control amount of the posture control, such as the braking amount, becomes large as well. As a result, the vehicle behavior after posture control has been performed will be too large with respect to the opposite direction, and there is the risk that it is difficult to rectify this behavior with respect to the opposite direction.

Moreover, the reason why k1 is set to a small value in regions with high $\mu$ is that when a large value is chosen for k1 to set a large steering angle component while a sufficient gripping force of the tires can be attained, then the posture control starts too early. That is to say, in regions with high $\mu$, suitable control intervention is realized even when the amendment ratio for the steering wheel component is not large, so that in regions with high $\mu$, k1 is set to a small value.

On the other hand, a lateral acceleration at a medium level (region with medium $\mu$) corresponds to the road surface $\mu$ of a road covered with packed snow, and there is a large possibility of sideslipping. Setting k1 to a large value at medium levels of lateral acceleration, the amendment ratio of the steering angle component is large, so that the posture control is performed at an early stage.

Thus, changing the value of k1 depending on the lateral acceleration ensures that posture control intervenes at suitable timing.

Then, at Steps S14 and Step S15, the deviation Δφ (θ, G) between the control target yaw rate Trφ and the actual yaw rate φ is calculated, and the procedure advances to Step S16. Step S16 sets the threshold deciding whether the first oversteer control is performed (first intervention threshold: THOS), the threshold deciding whether engine control for suppressing understeer is performed (THEUS), the threshold deciding whether the first understeer control is performed (THUS), the threshold deciding whether the second oversteer control is performed (second intervention threshold: THOSII), and the threshold deciding whether the third oversteer control is performed (third intervention threshold: THOSIII). It should be noted that THUS>THEUS. Furthermore, THOSII and THOSIII are set such that THOSI<THOS and THOSIII<THOSII. For example, it is possible to set THOSII to be about 10% smaller than THOS, and THOSIII to be about 20% smaller than THOS. It is also possible to set THOSII to be about 20% smaller than THOS, and THOSIII to be about 30% smaller than THOS.

When all thresholds have been set at Step S16, the procedure advances to Step S17.

Second Understeer Control

Steps S17 to S110 are the steps for the second understeer control. First, at Step S17, it is judged whether the steering wheel has been turned in a situation in which the vehicle is moving straight forward, and whether the deviation Δφ between the control target yaw rate Trφ and the actual yaw rate φ is smaller than the third intervention threshold THOSIII (Δφ<THOSIII). That is to say, when the steering wheel has been turned in a situation in which the vehicle is moving straight forward, the purpose of the second understeer control is to suppress a weak understeering tendency at the beginning of a turning of the steering wheel when the increase of the lateral G is small and it is difficult to detect the lateral G, as well as to suppress a situation in which the driver feels that there is an understeering tendency. For this reason, it is judged whether the steering wheel has been turned in a situation in which the vehicle is moving straight forward.

The reason why it is judged whether the yaw rate deviation Δφ (θ, G) is smaller than the third intervention threshold THOSIII is as follows: When there is an oversteering tendency, in which the yaw rate deviation Δφ is equal to or greater than the third threshold THOSIII, then it is first necessary to suppress this oversteering tendency. If the second understeer control for suppressing an understeering tendency intervenes in this situation, then there is the risk that it promotes the oversteering tendency. Therefore, in order not to intervene with the second understeer control, it is judged whether the yaw rate deviation Δφ (θ, G) is smaller than the third intervention threshold THOSIII.

At Step S17, if Δφ<THOSIII and the steering wheel has been turned in a situation in which the vehicle is moving straight forward, then the procedure advances to Step S18, whereas if the steering wheel has not been turned in a situation in which the vehicle is moving straight forward or if Δφ≧THOSIII, then the procedure advances to Step S111 (see FIG. 2B) without performing the second understeer control.

Step S18 judges whether the value of {change ratio of first target yaw rate φ (θ)} {change ratio of the actual yaw rate φ} has increased positively, or in other words, whether the actual yaw rate φ does not make a predetermined change with respect to the change of the first target yaw rate φ (θ) (following without changing) and φ (θ) and φ are moving away from one another. This judges whether in this situation the driver can feel an understeering tendency (a situation in which the actual yaw rate does not follow the change of the steering wheel), and if the first target yaw rate φ (θ) and the actual yaw rate φ have moved away from one another, it is judged whether in this situation there is a strong understeering tendency (initial understeering situation). If the result of the judgment is YES, then the procedure advances to Step S19, and if it is NO, then the procedure advances to Step S111.

Step S19 is the step in which the second understeer control intervenes. The upper limit of the brake pressure is set to 30 bar, and brake pressure is supplied to the cornering inside front wheel at the brake pressure gain of Kmax. Here, the brake pressure gain Kmax is the maximum gain (maximum brake pressure supply ratio (brake pressure supply amount per unit time)). However, when brake pressure is supplied at the gain Kmax, the supply of brake pressure is stopped when slippage increases or when the turning of the steering wheel is terminated.

Then at Step S110, if the value of {change ratio of first target yaw rate φ (θ)} {change ratio of the actual yaw rate φ} that tended to increase has been switched to a decreasing tendency, then the brake pressure is reduced. If {change ratio of first target yaw rate φ (θ)} {change ratio of the actual yaw rate φ} does not start to decrease, then the brake pressure is held without decreasing. With this control, the supply pattern of the brake pressure over time becomes trapezoid.

Thus, by intervention of the second understeer control at an initial state of understeering, separately from the first understeer control, strong understeering tendencies of the vehicle can be suppressed. Thus, the sense of stability felt by the driver can be improved. Moreover, by intervention of the second understeer control in a situation when the driver feels an understeering tendency, the posture of the vehicle is changed in a direction intended by the driver. Therefore, the controllability felt by the driver can be improved.

Moreover, in the second understeer control, the upper limit of the brake pressure is set to a relatively low pressure of 30 bar, and if {change ratio of first target yaw rate φ (θ)} {change ratio of the actual yaw rate φ} starts to decrease, the control is stopped. Therefore, even though the posture of the vehicle changes slightly in response to the steering of the driver due to the intervention of the second understeer control, this posture change is not large. When intervention of such a weak second understeer control, the driver feels that the behavior of the vehicle follows the driver's steering, and will hardly feel that control has intervened. As a result, an awkward feeling of the driver caused by the intervention of the control can be prevented, while the driving experience can be improved.

Moreover, the second understeer control intervenes when a sufficient yaw rate change with respect to the steering cannot be attained, when the steering wheel has been turned in a situation in which the vehicle is moving straight forward. Thus, the necessary yaw rate change can be attained near the entry into a cornering path. As a result, a situation can be avoided, in which a small cornering radius R must be taken near the exit of the cornering path. That is to say, it is possible to improve the tracing properties with respect to a target cornering trace.

Furthermore, in the second understeer control, the cornering inside front wheel is subjected to braking, so that it is effective to suppress an understeering tendency, and understeering can be suppressed reliably and fast.

Thus, the second understeer control is particularly useful at the begin of cornering when the intervention of the first understeer control with the second target yaw rate φ (G) based on the lateral G is difficult because the increase of the lateral G is small and the detection of the lateral G with the lateral G sensor is difficult. By intervention of this second understeer control with a reduced control amount at a comparatively early stage based on the steering wheel angle (first target yaw rate φ (θ)) and the actual yaw rate φ, it can be prevented that the understeering tendency is suppressed too late. At the same time, it can be avoided that the strong first understeer control intervenes abruptly. And what is more, the second understeer control is a control with a reduced control amount and a control in which the vehicle posture is modified in the direction intended by the driver. Therefore, even when the second understeer control intervenes early on, the driver will hardly notice that a control has intervened. Consequently, a high vehicle stability can be ensured and an awkward feeling of the driver can be prevented, while the sense of stability and controllability felt by the driver can be improved.

Engine Control

The Steps S111 to S118 following the steps of the second understeer control are the steps related to the engine control for suppressing an understeering tendency.

First, in Step S111, it is judged whether the above-mentioned THEUS is larger than the deviation Δφ (θ) between the first target yaw rate φ (θ) and the actual yaw rate φ. That is to say, it is judged whether engine control should be performed.

To judge whether engine control should be performed, the value of the first target yaw rate φ (θ) is taken as the reference, even when the second target yaw rate φ (G) has been selected as the target yaw rate in Step S13.

This is due to the following reason: If the first target yaw rate φ (θ) is taken as the control target yaw rate Trφ to perform the posture control, then, since the phase of the steering angle signal is fast, the posture control is usually started early on. Therefore, in this embodiment, early intervention of the posture control (first understeer control) is prevented by using both the first and the second target yaw rate. It should be noted that there is little damage in starting only the engine control early, because the driver will notice a decrease of the engine output less often than braking control.

Furthermore, first decelerating the vehicle is useful in order to avoid an understeering tendency, and if the vehicle is decelerated for this reason by reducing the engine output early on, then understeering can be avoided effectively.

Moreover, because of the substantially proportional relation between lateral acceleration and yaw rate, there is no large difference between the value φ (G) of the second target yaw rate based on the lateral acceleration and the actual yaw rate φ. Moreover, the actual yaw rate φ becomes instable in the case of an understeering tendency, so that if the second target yaw rate φ (G) is taken as the control target yaw rate Trφ, the correct intervention of control becomes difficult. For these reasons, the first target yaw rate φ (θ) is taken as the control target yaw rate Trφ for the judgment regarding the start of engine control.

Then, if the judgment at Step S111 is "YES", then the procedure advances to Step S112, and if the judgment is "NO", then the procedure advances to Step S113, and it is judged whether the first oversteer control should be started.

Step S112 judges whether the yaw rate acceleration is below a predetermined value. The purpose of this is to prevent erroneous intervention of a control, and it is judged whether the vehicle is subject to a posture change of at least a predetermined amount. Then, if the judgment is "YES", then the procedure advances to Step S114, and if the judgment is "NO", then the procedure advances to Step S117, the engine control is prohibited, and the procedure advances to Step S113.

Step S114 judges whether the vehicle is currently oversteering. This is because a situation is conceivable in which the vehicle moves out of the cornering path while rotating in the cornering direction, or in other words, an oversteering tendency and an understeering tendency occur simultaneously. In this situation, it is foremost necessary to rectify the posture of the vehicle by avoiding the oversteering tendency. If the result of the judgment is "YES", then the procedure advances to Step S117, where the engine control is prohibited, and then the procedure advances to Step S113. If, on the other hand, the judgment is "NO", then the procedure advances to Step S115.

Step S115 judges whether the brakes are currently released or not. This is because, if the driver is operating the brakes, then not only is no driving power generated and the effect of the engine control is small, but when engine control is performed and then the accelerator pedal is pressed down, then it is not possible to accelerate. Thus, in order not to perform unnecessary engine control, the procedure advances to Step S117 where engine control is prohibited, if the driver is operating the brakes. On the other hand, if the judgment is "YES", then the procedure advances to Step S116, and the engine suppression control amount for the engine control is calculated. Then, the procedure advances to Step S118, and engine control is performed by outputting a signal to the engine controller 37, that is to say, the engine output is reduced. After Step S118 has been finished, the procedure advances to Step S113.

First Oversteer Control

Steps S113 and S119 to S121 are the steps related to the first oversteer control. In Step S113, it is judged whether the first oversteer control should be carried out or not. This judgment regarding the first oversteer control is carried out by judging whether the yaw rate deviation $\Delta\phi$ ($\theta$, G) calculated in Steps S14 and S15 is larger than the first intervention threshold THOS. That is to say, the oversteering tendency expressed by the yaw rate deviation $\Delta\phi$ ($\theta$, G) is judged, depending on whether it is stronger than the first set reference expressed by the first intervention threshold THOS. If the judgment is "YES", then the procedure advances to Step S119, and the braking force applied to the outer front wheel for which the oversteering tendency is to be rectified, in other words the front wheel on the outer side with respect to the yaw rate rotation direction, is set in accordance with the yaw rate deviation $\Delta\phi$ ($\theta$, G).

When the braking amount has been set, the procedure advances to Step S120, and the braking force control is carried out. This is done by controlling the pressurizing motor 32, the front and rear solenoids 33 and 34, and the TSW and ASW solenoids 35 and 36 (see lower diagram in FIG. 7). Then, the procedure advances to Step S121, a termination judgment of the first oversteer control is performed, and the procedure returns. This termination judgment is explained in detail below.

Second and Third Oversteer Control

If the result of the judgment at Step S113 is "NO", then the procedure advances to Step S122. The Steps S122 to S127 are the steps related to the second and third oversteer control.

At Step S122, it is judged whether the second oversteer control should be carried out. This judgment regarding the second oversteer control is carried out by judging whether the yaw rate deviation $\Delta\phi$ ($\theta$, G) set at Step S14 or Step S15 is larger than the second intervention threshold THOSII, that is THOSII<$\Delta\phi$. That is to say, it is judged whether the oversteering tendency expressed by the yaw rate deviation $\Delta\phi$ ($\theta$, G) is stronger than the second set reference expressed by the second intervention threshold THOSII. If THOSII<$\Delta\phi$, in other words if the judgment is "YES", then the procedure advances to Step S123, and if THOSII$\geq$$\Delta\phi$, in other words if the judgment is "NO", then the procedure advances to Step S124.

Step S123 is the step at which the second oversteer control suppressing a relatively weak oversteering tendency intervenes, and brake pressure is supplied at once to the cornering outside front wheel at the gain Kmax with a brake pressure of P2 (15 bar) as the upper limit (see lower diagram in FIG. 7). Then, when the yaw rate deviation $\Delta\phi$ while supplying brake pressure has decreased, the supply of brake pressure is stopped, and the brake pressure is changed to reduced pressure. Consequently, when the yaw rate deviation $\Delta\phi$ has increased, a brake pressure of up to the upper limit brake pressure P2 is supplied.

At the next Step S126, a termination judgment of the second oversteer control is performed. That is to say, Step S126 judges whether $\Delta\phi$ has converged or not (whether $\Delta\phi$ has been decreased or not). If $\Delta\phi$ has been decreased by intervention of the second oversteer control (i.e. "YES"), the procedure advances to Step S127, the control is gradually brought to an end, and the procedure returns. On the other hand, if $\Delta\phi$ has not converged (i.e. "NO"), then the procedure returns without advancing to Step S127, and the second oversteer control is continued.

If at Step S122 THOSII$\geq$$\Delta\phi$ (i.e. "NO") and the procedure has advanced to Step S124, then Step S124 judges whether the third oversteer control should be carried out. This judgment regarding the intervention of the third oversteer control is performed by judging whether THOSIII<$\Delta\phi$. That is to say, it is judged whether the oversteering tendency expressed by the yaw rate deviation $\Delta\phi$ ($\theta$, G) is stronger than the third set reference expressed by the third intervention threshold THOSIII. If THOSII<$\Delta\phi$, in other words if the judgment is "YES", then the procedure advances to Step S125, and if THOSII$\geq$$\Delta\phi$, in other words if the judgment is "NO", then the procedure advances to Step S128 (see FIG. 2C).

In this Step S125, at which the third oversteer control intervenes, brake pressure is supplied at once to the cornering outside front wheel at the brake pressure gain Kmax with an upper limit brake pressure (hydraulic) of P1 (5 bar). After that, a feedback control is carried out, in which brake pressure is supplied in accordance with $\Delta\phi$ at a gain $K_1$ ($K_1$<Kmax). In this situation, the upper limit of the brake pressure is set to P2 (15 bar) (see lower diagram in FIG. 7). Thus, in the third oversteer control, brake pressure is supplied at the brake pressure gain $K_1$, so that the supply ratio of the brake pressure is lower than the supply ratio (gain Kmax) of the brake pressure in the second oversteer control.

After the brake pressure has been supplied at Step S125, the termination judgment is carried out at Step S126, and if $\Delta\phi$ is converging (i.e. "YES"), the procedure advances to Step S127, and the control is gradually terminated. On the other hand, if $\Delta\phi$ is not converging (i.e. "NO"), then the procedure returns without advancing to Step S127, and the third oversteer control is continued.

Thus, if the oversteering tendency is relatively weak (THOSII, THOSII<Δφ), then the relatively weak oversteering tendency and the increase of the oversteer are both suppressed by the intervention of the second or the third oversteer control, and that the sense of stability as well as the ease of maneuvering felt by the driver are improved.

On the other hand, the intervening second and the third oversteer controls are weak controls in which the upper limit of the brake pressure is set to be low, thus decreasing the control amount. Therefore, the control does not become excessive, and it can be avoided that an unnecessary operation becomes too strong.

Moreover, if the oversteering of the vehicle has increased (become stronger) even though the third oversteer control has intervened (THOSII<Δφ), then the second oversteer control intervenes, replacing the third oversteer control. Furthermore, if the oversteering of the vehicle has increased even though the second oversteer control has intervened (THOS<Δφ), then the first oversteer control intervenes, replacing the second oversteer control. Thus, the strong first oversteer control does not intervene abruptly, but the system moves continuously from the weaker second and third controls to the strong first oversteer control. Thus, abruptly intervention of the strong first oversteer control causes an awkward feeling of the driver, but this awkward feeling can be eliminated. At the same time, by intervention of the second or the third oversteer control before the first oversteer control, the play of the brake system is eliminated (leading to a situation in which break pads adhere on the disk rotor). Therefore, the responsiveness of the first oversteer control can be improved. Furthermore, if the first oversteer control intervenes in continuation of the third and the second oversteer control, then the same result is attained as if the threshold for starting control is reduced, so that changes in the posture of the vehicle become continuous and an even better stability of the vehicle can be ensured.

Furthermore, in the second oversteer control, brake pressure is supplied by an open control at the maximum gain Kmax. Therefore, the responsiveness of the control is improved. Moreover, the upper limit of the brake pressure P2 is set to a pressure (15 bar) that is lower than the brake pressure (brake pressure that can be supplied by the brake system) for the first oversteer control, so that an oversteer control can be achieved, in which the control amount is lower than in the first oversteer control.

On the other hand, in the third oversteer control, the brake pressure is supplied by a feedback control depending on the yaw rate deviation Δφ. Therefore, the suppression of the oversteering tendency does not become excessive, and it is possible to achieve the optimum control. As a result, the driving experience is not disturbed.

Moreover, by setting the upper limit of the brake pressure P2 in the second and the third oversteer control to 15 bar, it is possible to keep the controls at a level that is hardly noticed by the driver, even though the posture of the vehicle in yawing direction changes slightly. It should be noted that the upper limit of the brake pressure can be set within a range of 10 to 25 bar, but in order to both achieve control of the posture of the vehicle and prevent an awkward feeling of the driver caused by the driver noticing the control intervention, it is most preferable that the upper limit of the brake pressure is set to 15 bar. Moreover, it is also possible to modify the upper limit of the brake pressure at the second oversteer control in accordance with the road surface A. For example, it is possible to set the maximum brake pressure to 15 bar on roads with a low $\mu$ and to 50 bar on roads with a high $\mu$.

Thus, by providing a second and a third overster control in addition to the first overster control, it is possible to improve the sense of stability and the ease of control felt by the driver, while ensuring a high stability of the vehicle.

First Understeer Control

Steps S128 to S134 are the steps related to the first understeer control. If the result of the judgment at Step S124 is "NO", and the procedure advances to Step S128, then Step S128 judges whether the first understeer control should be started or not. This judgment is explained in detail below. If Step S128 judges that control should be started (i.e. "YES"), then the procedure advances to Step S129, and if Step S128 judges that control should not be started (i.e. "NO"), then the procedure returns.

At Step S129, it is judged whether the understeering tendency is weak. If it is weak, then the procedure advances to Step S130, and if it is strong, then it advances to Step S131.

At Step S130, the braking amount for the inner front wheel is calculated. This is, because when the understeering tendency is weak, it is likely that the front wheels have gripping power. Also, applying a braking force to the front wheels, the braking efficiency is better than when applying a braking force to the rear wheels, which means that the vehicle can be decelerated more effectively. Therefore, if the understeering tendency is weak, understeer control can be performed reliably and fast by braking the inner front wheel.

On the other hand, Step S131 calculates the braking amount for the inner rear wheel. This is, because when the understeering tendency is strong, it is likely that the front wheels have no gripping power. Therefore, when the understeering tendency is strong, the braking force is applied to the inner rear wheel.

If the braking amount has been calculated in this manner, the procedure advances to Step S132, and the control of the braking power is carried out.

Then, at Step S133, a termination judgment of the first understeer control is carried out. This is done by judging whether the yaw rate deviation Δφ (θ, G) has become smaller than the threshold THUS. If the result of this judgment is "YES", then the procedure advances to Step S134, the control is terminated, and the procedure returns. On the other hand, if it is "NO", then the procedure returns without terminating the procedure.

Judgment Regarding Start of the First Understeer Control

Figure 4:
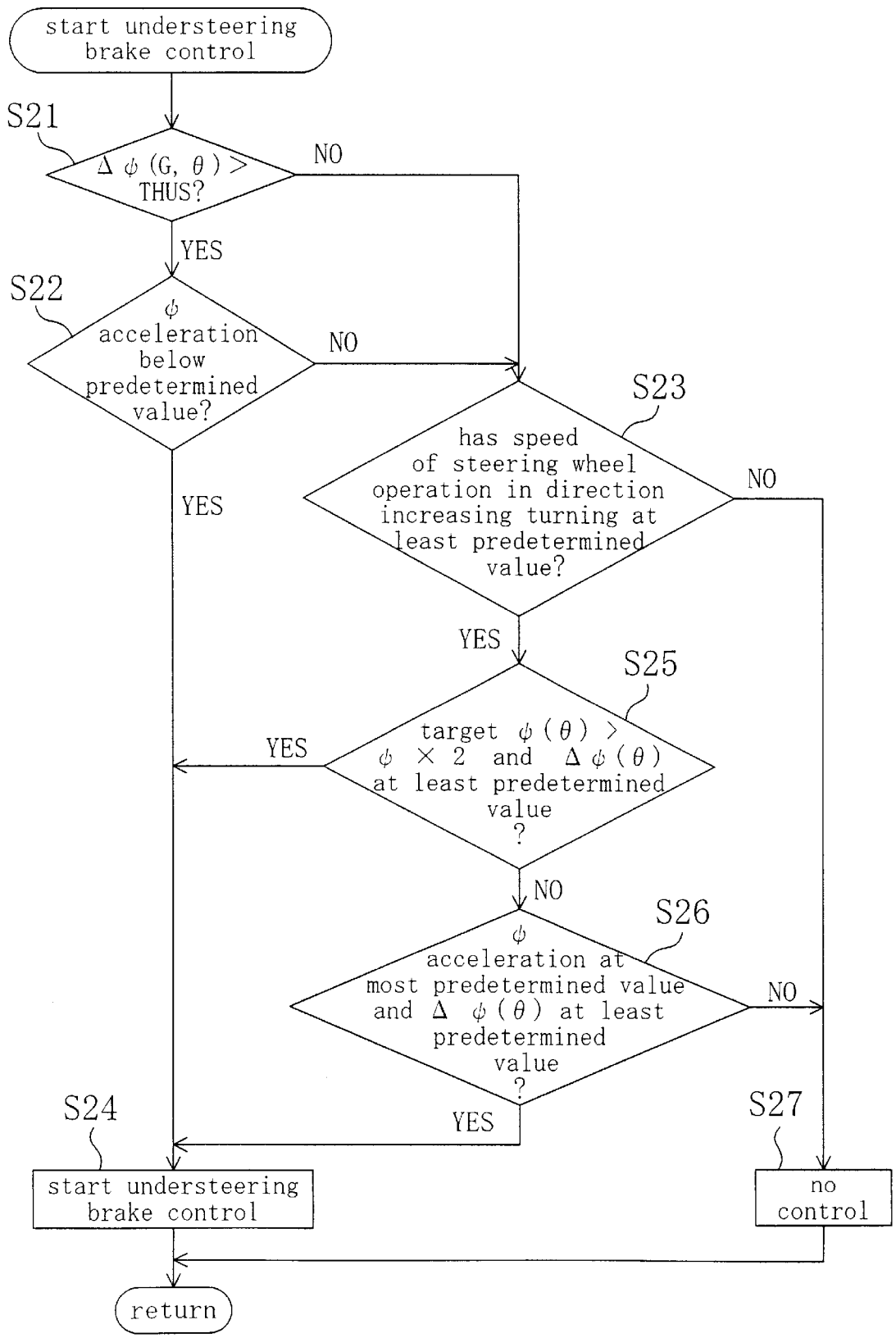
FIG. 4 is a flowchart of the judgment regarding the start of the first understeer control.

Referring to the flowchart in FIG. 4, the following is an explanation of the judgment at Step S128 regarding the start of the first understeer control for suppressing an understeering tendency. In this judgment regarding the start of the control, it is not only judged whether the yaw rate deviation Δφ (θ, G) has exceeded a threshold THUS, but measures are taken so that the control is started depending on other conditions as well.

First, Step S21 judges whether the yaw rate deviation Δφ (θ, G) is larger than the intervention threshold of the first understeer control. If the judgment is "YES", then the procedure advances to Step S22, and if it is "NO", then the procedure advances to Step S23.

At this Step S22, it is judged whether the acceleration of the actual yaw rate φ is below a predetermined value. This is done for the same purpose as in the afore-mentioned Step S112 (see FIG. 2B), namely to prevent erroneous intervention of a control.

Figure 5:
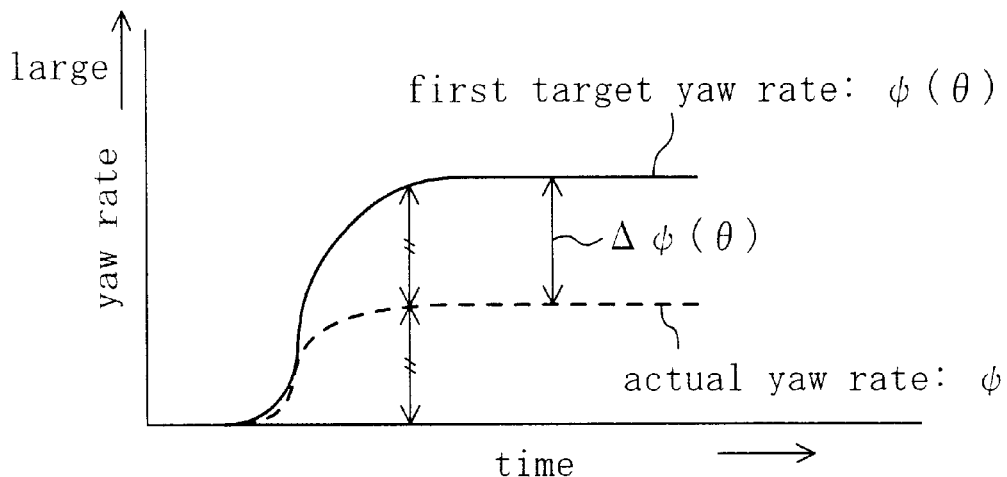
FIG. 5 shows the relation between the actual yaw rate and the first target yaw rate, illustrating the conditions for the start of the first understeer control.
Figure 6:
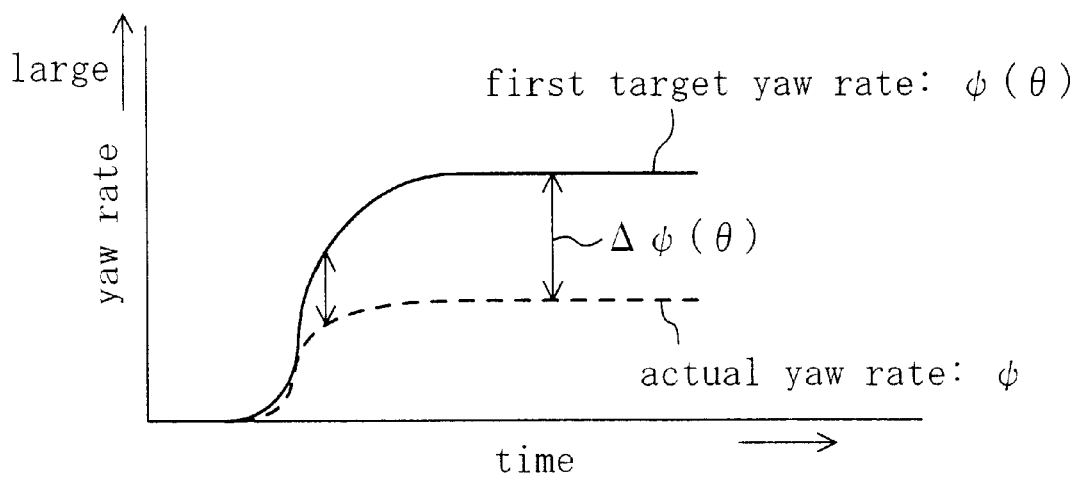
FIG. 6 shows the relation between the actual yaw rate and the first target yaw rate, illustrating the conditions for the start of the first understeer control, different from FIG. 5.

Then, Step S23 judges whether the speed of the steering wheel operation in the direction increasing the turning (i.e. decreasing the curve radius) has at least a predetermined value. If the judgment is "YES", then the procedure advances to Step S25, and if it is "NO", then the procedure advances to Step S27, and the procedure returns without performing control. Then, Step S25 judges whether, as shown in FIG. 5, the first target yaw rate φ (θ) is two times larger than the actual yaw rate φ, and whether the value Δφ (θ) of {first target yaw rate φ (θ) actual yaw rate φ} is at least a predetermined value. If the judgment at Step S25 is "NO", then the procedure advances to Step S26, and it is judged whether, as shown in FIG. 6, the acceleration of the actual yaw rate φ is not greater than a predetermined value, and whether Δφ (θ) has at least a predetermined value. If the judgment is "NO", then the procedure advances to Step S27, and the procedure returns without performing control.

Step S25 judges whether the deviation between the first target yaw rate φ (θ) and the actual yaw rate φ is large, whereas Step S26 judges whether the spread of the deviation between the first target yaw rate φ (θ) and the actual yaw rate φ is fast. If the judgment at Step S25 or at Step S26 is "YES", then the procedure advances to Step S24, and the braking control begins.

That is to say, when the posture control is started based only on whether the yaw rate deviation Δφ (θ, G) is larger than the threshold THUS, the control will also be started when the driver intentionally causes an understeering tendency, as in intentional understeering. For this reason, the control is carried out only when the steering wheel is turned but the yaw rate does not increase accordingly, or in other words, when the vehicle tends to understeer while not acting as intended by the driver.

Judgment Regarding Start of Oversteer Control

The following is an explanation of the judgment regarding the start of the oversteer control. As mentioned above, in the judgments regarding the start of the first to third oversteer control, of the first and the second target yaw rate φ (θ, G), the one with the smaller absolute value is taken as the control target yaw rate Trφ, and the judgment is carried out by judging whether the deviation Δφ (θ, G) between the control target yaw rate Trφ and the actual yaw rate φ is larger than the intervention thresholds (first to third intervention thresholds) THOS, THOSII and THOSIII of the oversteer control.

For example, when the absolute value of the second target yaw rate φ (G) is smaller than the absolute value of the first target yaw rate φ (θ) as shown in FIG. 7, then the second target yaw rate φ (G) is taken as the control target yaw rate Trφ (see T1 in FIG. 7). Here, the reason why the control target yaw rate Trφ (see broken curve in FIG. 7) is larger than the second target yaw rate φ (G) (solid line in FIG. 7) is that the control target yaw rate Trφ is amended by the steering angle component (see Equation (3)).

Then, when the yaw rate deviation Δφ has become larger than the third intervention threshold THOSIII, the third oversteer control intervenes. As explained above, during this third oversteer control, brake pressure is supplied at once with the brake pressure gain Kmax at up to an upper limit brake pressure P1 (5 bar). After that, a feedback control is performed, in which the brake pressure is supplied at a gain of $K_1$ ($K_1$<Kmax) accordance with Δφ (see Step S125 in FIG. 2B and lower diagram in FIG. 7). Moreover, when the yaw rate deviation Δφ has become larger than the second intervention threshold THOSII, the second oversteer control intervenes. As explained above, during this second oversteer control, an open control is performed, in which the brake pressure is supplied at once at the gain of Kmax at up to a maximum brake pressure P2 (15 bar) (see Step S123 in FIG. 2B and lower diagram in FIG. 7). Moreover, if the yaw rate deviation Δφ becomes larger than the first intervention threshold THOS, the first oversteer control intervenes.

If for example the driver performs counter-steering in order to rectify the oversteering tendency, then the value of the first target yaw rate φ (θ) may become smaller than the second target yaw rate φ (G). In this situation, the control target yaw rate Trφ is changed from the second target yaw rate φ (G) to the first target yaw rate φ (θ) (see T2 in FIG. 7).

When counter-steering has been performed in this manner, then, following the change of the first target yaw rate φ (θ), the value of the actual yaw rate becomes smaller than the second target yaw rate φ (G). In this situation, if the control target yaw rate Trφ is still set to the second target yaw rate φ (G), then the oversteer control switches to understeer control. Switching to understeer control in this manner, leads to a control in which the posture of the vehicle in yawing direction is still in an oversteering tendency, and even though the driver tries to counter-steer, this counter-steering is without effect, and the oversteering tendency is promoted. If, by contrast, the smaller one of the first and the second target yaw rate φ (è, G) is taken as the control target yaw rate Trφ, then, even when counter-steering is performed, the oversteer control (first oversteer control) will be continued, and this problem is avoided.

When the first target yaw rate φ (θ) passes the neutral point, and the sign of the first target yaw rate φ (θ) is different from the sign of the second target yaw rate φ (G), then the control target yaw rate Trφ is constant at a certain value (see T3 in FIG. 7), and when after that the first and the second target yaw rates φ (θ, G) come to have the same sign, the one with the smaller absolute value of the first and the second target yaw rates φ (θ, G) (in FIG. 7, this is the second target yaw rate φ (G)) is set as the control target yaw rate Trφ (see T4 in FIG. 7).

Thus, the reason why the control target yaw rate Trφ is kept at a constant value is to avoid that the control gain becomes too large, for example when the steering angle crosses the neutral point. Moreover, if the control target yaw rate Trφ stays set to the first target yaw rate φ (θ), then the control amount becomes large, and there is the risk that the vehicle spins in the opposite direction. Thus, when the vehicle starts to spin in the opposite direction, it becomes difficult to rectify this opposite spin, so that when the values of the first and second target yaw rates φ (θ, G) have different signs, the target yaw rate Trφ is kept at a predetermined value.

It should be noted that if this predetermined value is set to the neutral point for example, then the vehicle can thereafter not cause a posture change in the yawing direction. For this reason, the predetermined value is set to a value at a certain offset with respect to the neutral point.

Counter-Steering Converging Control

As mentioned above, in the case of an oversteering tendency, the driver sometimes tries to counter-steer. Also in this case, suitable control for rectifying the oversteering tendency is carried out, but due to the braking control of the posture control, the posture change of the vehicle becomes larger than the corresponding steering wheel operation. Thus, sometimes an oversteering tendency in the opposite direction occurs, caused by a delay of returning the steering wheel after the driver has counter-steered, for example. As a result, there is the risk that the posture of the vehicle in the yawing direction does not converge.

In order to prevent such an oversteering tendency in the opposite direction, a braking force is applied to the cornering inside front wheel. FIG. 8 is a flowchart of the convergence control after counter-steering. First, in Step S31, it is judged whether oversteer control is still being carried out, or whether the step is within a predetermined time after such control. If the result of the judgment is "YES", then the procedure advances to Step S32, and if it is "NO", then the procedure returns.

Step S32 judges whether the driver is counter-steering or not. This judgment is carried out by judging whether the value of the actual yaw rate φ has become larger than the first target yaw rate φ (θ) based on the steering angle or vice versa, or whether the steering angle speed has reversed. If the result of this judgment is "YES", then the procedure advances to Step S33, whereas if it is "NO", then the procedure returns.

Step S33 judges whether the counter-steering amount is large. This can be done for example by judging whether the oversteering tendency before the counter-steering is large (strong) or whether the steering angle speed of the steering wheel is large when performing the counter-steering. If the result of this judgment is "YES", then the procedure advances to Step S34, and if it is "NO", then the procedure returns.

Step S34 judges whether the steering angle speed has reversed or not. This is done by judging whether, after counter-steering has been performed, the steering wheel is turned back into its original position or not. If the result of this judgment is "YES", then the procedure advances to Step S35, and if it is "NO", then the procedure returns.

In Step S35, it is judged whether the actual yaw rate φ following the change of the steering angle. That is to say, if the actual yaw rate φ is following the change of the steering angle, then it is likely that the yaw rate position is approaching convergence, so that no braking force is applied to the cornering inside front wheel. If the actual yaw rate is following the change of the steering angle while the braking force is applied, then it is also possible to stop the application of the braking force.

Then, if the result of the judgment at Step S35 is "NO", then the procedure advances to Step S36, and a braking force is applied to the cornering inside front wheel, whereas if it is "YES", then the procedure returns.

With this control, it can be avoided that the vehicle oversteers in the opposite direction after counter-steering has been performed.

Setting of the Threshold for the First Understeer Control

Figure 2A:
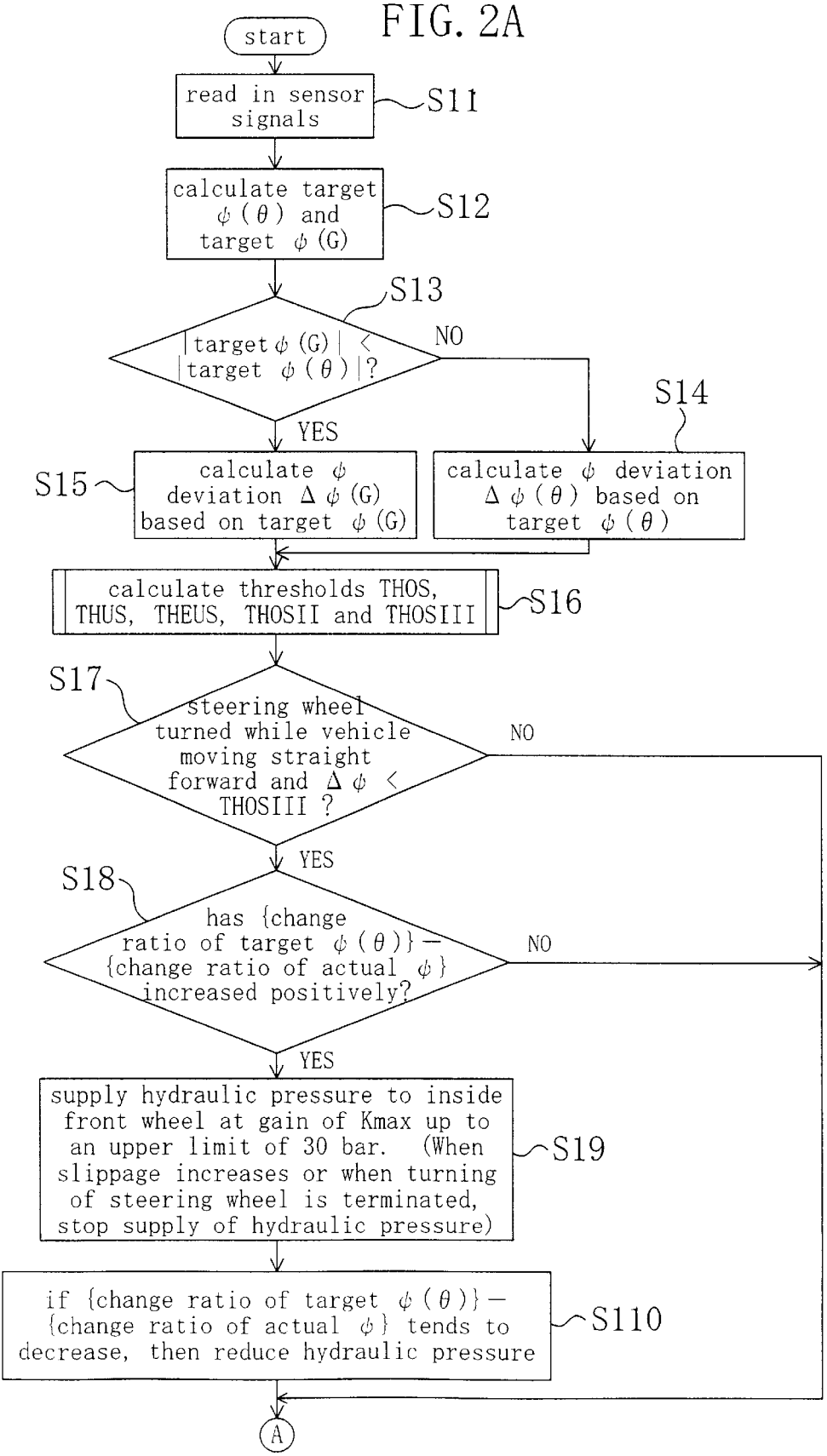
FIG. 2A is a flowchart of a portion of the posture control.
Figure 2B:
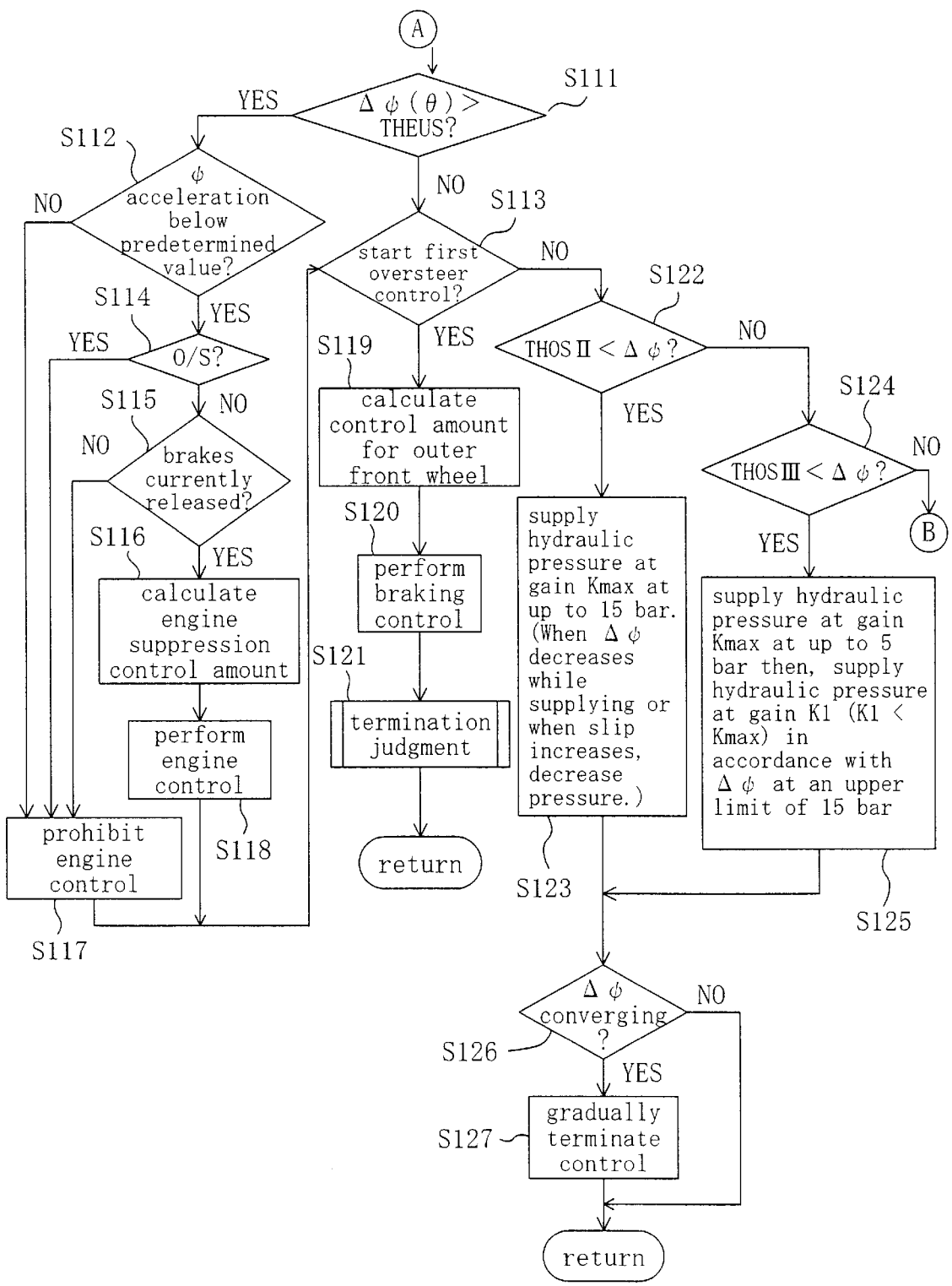
FIG. 2B is a flowchart of a portion of the posture control.
Figure 2C:
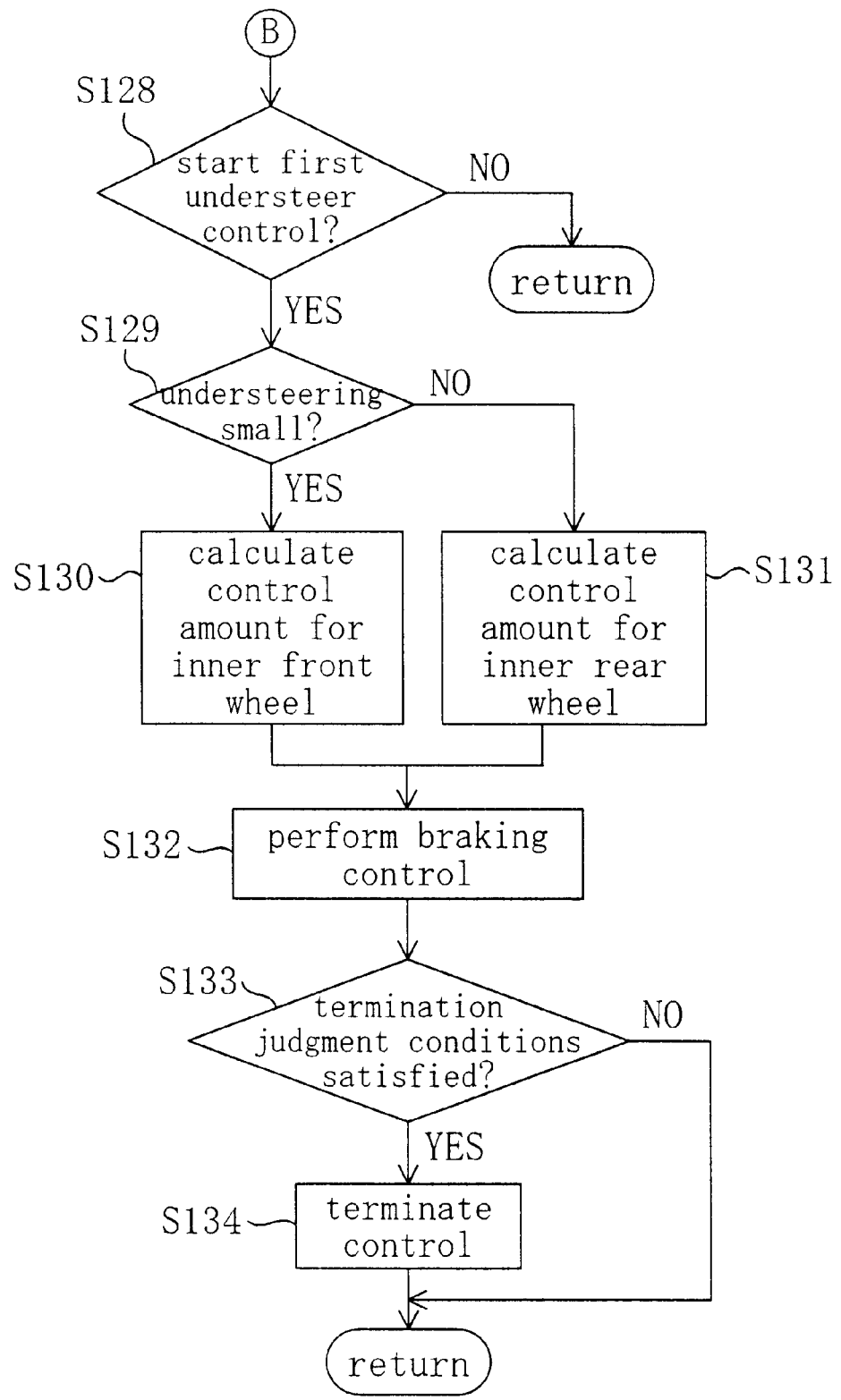
FIG. 2C is a flowchart of a portion of the posture control.

Referring to FIG. 9, the following explains how the threshold THUS of the first understeer control is set in Step S16 (see FIG. 2A). The threshold THUS is set by determining a basic threshold, which is then amended.

First, at Step S41, a basic threshold is set. This basic threshold should be set to a predetermined constant.

Then at Step S42, if the steering wheel is being returned, the intervention of control is suppressed (that is, intervention of control is held back) by increasing the threshold in proportion with the steering operation speed. This is because if the steering wheel is turned back although there is an understeering tendency, then it is likely that the driver understeers intentionally. If the driver understeers intentionally, then it is preferable to suppress the intervention of control and to leave the operation up to the driver. Thus, by suppressing the intervention of control, the interference of the intervention of control into the operation of the driver can be avoided from the beginning.

Then, Step S43 suppresses the intervention of control by increasing the threshold in proportion with the variation of the actual yaw rate (i.e. the change of the actual yaw rate). This is because if the actual yaw rate tends to increase, then the understeering tendency is rectified. By contrast, when the control intervenes too early in this situation, the change of the yaw rate becomes large, and as a result, an oversteering tendency may occur. Thus, in order to avoid an erroneous intervention of control in this case, the threshold is increased.

Step S44 suppresses the intervention of control by increasing the threshold when the steering wheel is near the neutral position. This is because understeering usually occurs when the steering wheel has been turned, and when the steering wheel is near the neutral position, it is not necessary to suppress an understeering tendency. Thus, in order to avoid erroneous intervention in such a situation in which understeering can hardly occur, the threshold is increased to suppress the intervention of control.

Step S45 hastens the intervention of control by lowering the threshold value accordingly when the lateral acceleration is small (in a low μ region). This is because during low μ, such as on an icy road, there is a greater chance of an understeering tendency, so that in that case, the posture control intervenes at an early stage.

Step S46 hastens the intervention of control by lowering the threshold value accordingly when during cornering the second target yaw rate φ (G) has decreased by at least a predetermined value. This aims at hastening the intervention of control if the road surface μ decreases abruptly and the vehicle slips sideways, for example when the road surface is partially frozen. In other words, when the road surface μ changes abruptly, the driver cannot operate the steering wheel, or a long time is necessary until the driver operates the steering wheel. In this situation, if the posture control is performed using for example only the first target yaw rate φ (θ), it becomes impossible to start the posture control, because the first target yaw rate φ (θ) does not fluctuate. By contrast, in this embodiment, the posture control is carried out using the second target yaw rate φ (G) which is based on the lateral acceleration, so that it becomes possible to perform precise control early on, even under such fluctuations of the road surface μ.

In this manner, the threshold THUS of the first understeer control is set.

Setting of the Threshold for the First Oversteer Control

Referring to FIG. 10, the following explains how the threshold THOS of the first oversteer control (first intervention threshold) is set in Step S16 (see FIG. 2A). Also this first intervention threshold THOS is set by determining a basic threshold, which is then amended.

First, at Step S51, a basic threshold is set. As shown in FIG. 11, the basic threshold is set to a larger value the smaller the vehicle speed V is. And when the speed is extremely low, the basic threshold is set to an even higher value.

Then, in Step S52, as shown in FIG. 12, the threshold is amended to a higher value the higher the lateral acceleration is, and the amendment is larger the larger the vehicle speed is. This is because when for example the lateral acceleration is low, that is to say in regions with low μ, an oversteering tendency occurs more easily, so that intervention of control is hastened by setting a low threshold. Conversely, if the lateral acceleration is high (in high μ regions) and the driving speed is high, then the posture of the vehicle changes quickly, so that when the threshold is low, erroneous intervention of posture control occurs easily. Furthermore, a driver who can maneuver the vehicle at high speeds on high μ regions is likely to be able to deal with slight posture changes of the vehicle. Therefore, the interference of posture control into the driver's operation should be prevented, and a high threshold is set in high lateral acceleration regions and in high sped regions.

At Step S53, intervention of control is suppressed by increasing the threshold in inverse proportion to the steering angle. For example, even when the steering angle is small, it may occur that the orientation of the vehicle and the orientation of the steering wheel are opposite, in particular due to such disturbances as an icy road. In such a case, the vehicle automatically assumes a stable driving orientation without performing posture control, so that the intervention of control is suppressed.

At Step S54, the intervention of control is suppressed by increasing the threshold, the increase being larger the slower the steering wheel is returned. This is because if the driver returns the steering wheel slowly, then it is likely that the driver himself can adequately rectify an oversteering tendency without the intervention of control. Therefore, the threshold suppressing the intervention of control is increased.

Then, at Step S55, the intervention of control is suppressed by increasing the threshold when the yaw rate overshoots. "Overshooting of the yaw rate" means that, as shown in FIG. 13, when the steering wheel is returned from a turned orientation to the neutral point, the actual yaw rate φ overshoots even though the vehicle is not in an unstable state. In such a case, it is judged that there is an oversteering tendency, so that the threshold is increased to suppress the intervention of control.

At Step S56, if the variations of the yaw rate are large, the intervention of control is suppressed by increasing the threshold. The purpose of this is to prevent erroneous intervention of control.

At Step S57, the threshold is lowered in case that countersteering or tuck-in in a front-wheel driven vehicle is judged, in which the front wheels are the driven wheels, is performed. Here, tuck-in is judged to be the case when for example the following conditions are satisfied: The steering angle is at a constant turned orientation, the car is in the lower second or third gear, and the accelerator pedal has returned and the throttle opening is small. Counter-steering is judged by the steering wheel angle.

Then in Step S58, when the basic threshold has been increased by the above-described steps, there is the risk that the threshold has been set to a value that is too high, so that an upper limit is set. Thus, the first intervention threshold THOS serving as the threshold for the first oversteer control is set.

Termination Judgment of the First Oversteer Control

Next, referring to the flowchart shown in FIG. 14, the termination judgment of the first oversteer control (see Step S12 in FIG. 2B) is explained. The purpose of this control is to avoid interference of posture control into the driver's operation, while making sure that the posture control is terminated in a position in which the posture of the vehicle is stable.

First, Step S61 judges whether the steering wheel has been stabilized such that the vehicle advances straight forward, or in other words, whether the steering angle has been stabilized substantially at the neutral position. If the result of the judgment is "NO", then the procedure advances to Step S62.

Step S62 judges whether the steering wheel has been turned. If the judgment is "NO", then the procedure advances to Step S63.

Step S63 judges whether the deviation between the second target yaw rate φ (G) and the actual yaw rate φ has been stabilized at below a predetermined value. That is to say, it is judged whether both values are sufficiently low, and almost matching. If the judgment is "NO", then the procedure advances to Step S65.

Then, if the judgment at any of Steps S61 to S63 is "YES", then the procedure advances to Step S64, the control is terminated and the procedure returns. With the judgment of Step S61, it is likely that the driver is operating the steering wheel calmly, so that it is not necessary to perform posture control. On the contrary, if posture control is performed in this situation, then there is the risk that the posture control interferes with the driver's operation. At the judgment at Step S62, judging the fact that the driver turns the steering wheel in the direction promoting the oversteering tendency, it is likely that the driver intentionally corners provoking an oversteering tendency, or that the driver intentionally lets the vehicle spin, for example to avoid an accident. In this case, interference of the posture control with the driver's operation is prevented by quickly terminating the posture control. Moreover, at the judgment at Step S63, judging the fact that the vehicle is in a stable state in which the second target yaw rate φ (G) substantially matches the actual yaw rate φ, it can be concluded that the posture of the vehicle has been stabilized. Consequently, there is no necessity to perform posture control, so that the control is terminated.

Then, Step S65 judges whether the estimated brake pressure, which is estimated from the braking amount at the posture control, is substantially the same as the pressure in the master cylinder. That is to say, it is judged whether it is likely that the posture control can be terminated substantially without controlling the braking force. If the judgment is "YES", then the procedure advances to Step S66, whereas if it is "NO", then the procedure advances to Step S69.

Step S66 judges whether the slip angle β is small. That is to say, it judges whether lateral slipping is occurring or not. If the judgment is "YES", then the procedure advances to Step S67, and if it is "NO", then the procedure returns without terminating the control.

Step S67 judges whether the second target yaw rate φ (G), the first target yaw rate φ (θ) and the actual yaw rate φ are all below a predetermined value. That is to say, it is judged whether these three values are smaller than a predetermined value and are nearing each other. This judgment judges whether the vehicle is traveling substantially straight forward, the steering wheel is not being operated, and there is no need to perform posture control. That is to say, since the conditions of Step S63 are sometimes difficult to satisfy, this judgment terminates the posture control under conditions that are looser than the conditions of Step S63. Then, if the judgment is "YES", the procedure advances to Step S68, which judges whether a predetermined period of time T1 has elapsed after the afore-mentioned conditions have been fulfilled. That is to say, it is conceivable that the conditions are accidentally fulfilled, so that it is judged whether a predetermined period of time has elapsed. If the judgment is "YES", then the procedure advances to Step S612, the posture control is terminated, and the procedure returns.

Step S69 judges whether the slip angle β is small. If the judgment is "YES", then the procedure advances to Step S610.

Step S610 judges whether two of the second target yaw rate $\phi$ (G), the first target yaw rate $\phi$ (θ) and the actual yaw rate $\phi$ are below a predetermined value, and the remaining value is not very different from a predetermined value. This is a condition that is looser than the condition of Step S67. If the judgment is "YES", then the procedure advances to Step S611, which judges whether a predetermined period of time T2 has elapsed after the conditions of Step S610 have been fulfilled. The predetermined period of time T2 is longer than the predetermined period of time T1 in Step S68, because the condition is looser than the condition of Step S67. Then, if the judgment is "YES", then the control is terminated, and the procedure returns.

On the other hand, if the judgment at Steps S67, Step S68, Step S610 and Step S611 is in all cases "NO", then the control is continued and the procedure returns.

By continuing the control until the vehicle is in a stable driving state, it can be prevented that cases occur, in which the termination of the control is judged based only on the deviation between the control target yaw rate Tr$\phi$ and the actual yaw rate $\phi$, leading to a too early termination of the posture control.

Moreover, such a termination judgment of the posture control is also useful when continuing posture control is necessary after posture control has been performed once, for example avoiding an obstacle. By repeating termination and begin of control in a short period of time, the risk of posture changes brought about by the termination of the posture control, as well as unstabilities of the driving operation can be prevented by continuing the control until the vehicle is in a stable driving state.

On the other hand, in situations in which the driver does not need the control, an interfering of the posture control with the operation of the driver can be avoided by terminating the posture control early.

Control of the Brake Fluid Pressure

Referring to the flowchart shown in FIG. 15, the following explains the braking fluid pressure (hydraulic) control for the first oversteer control and the first understeer control. In this braking fluid control, the pressure is not feedback controlled, but controlled in two phases. In a first phase, the braking fluid is pressurized with a predetermined pressurizing (pressure-increasing) speed, and in a second phase (pressure adjustment state), the braking fluid is adjusted when braking force is applied by pressurizing the braking fluid to change the posture of the vehicle.

First, Step S71 judges whether behavior control (that is, first oversteer control or first understeer control) has been started or not. Then, Step S72 judges whether oversteer control is carried out. If the judgment is "YES" (in case of oversteer), then the procedure advances to Step S73, and if it is "NO" (in case of understeer), then the procedure advances to Step S74.

At Step S73, the brake pressure is pressurized with a pressurizing speed at the mechanical limit (hydraulic pressure MAX). That is to say, the pressurizing pump 32 is operated at the mechanical limit. The pressurizing is carried out after completely opening the ASW solenoid valve 36 as well as the front and rear solenoid valves 33 and 34 arranged in the supply path to the wheels to which a braking force is applied.

Step S77 judges whether the slip ratio has at least a predetermined value or not. Here, the slip ratio can be calculated based on the estimated vehicle speed and the wheel speed obtained from the detection signal of the wheel speed sensors 11. This judgment is performed with the purpose of preventing an excessive braking fluid pressure. That is to say, when the slip ratio has at least a predetermined value, then the braking fluid pressure becomes too high if the braking fluid is further pressurized. If the judgment is "NO", then the procedure advances to Step S78.

Step S78 judges whether the peak of the acceleration of the change of the slip angle β has already passed. If the judgment is "YES", then the procedure advances to Step S79, and if it is "NO", then the procedure advances to Step S710.

Step S79 judges whether either one of the change rate (change speed) of the yaw rate deviation Δ$\phi$ (θ, G) and the change acceleration of the yaw rate deviation Ä$\phi$ (θ, G) is decreasing, that is whether the yaw rate deviation is changing in a convergence direction.

Step S710 judges whether either one of the change rate of the slip angle β and the change acceleration of the slip angle β is decreasing even though the peak of the slip angle has not passed, that is, whether the slip angle is changing in a convergence direction.

Steps S78 to S710 judge whether the posture of the vehicle has changed due to the application of braking force by pressurizing the braking fluid, that is, whether the effect of posture control has been attained or not.

Then, if the judgment at any of Step S77, Step S79 and Step S710 is "YES", the procedure advances to Step S711, which judges whether a predetermined period of time T4 has elapsed after starting to pressurize the braking fluid. This predetermined period of time T4 should be set in consideration of the starting threshold of the posture control and the characteristics of the braking fluid pressurizing control system, such as the pressurizing pump 32. That is to say, the predetermined period of time T4 should be set to the time that, judging by the characteristics of the braking fluid pressurizing system, is minimally necessary to increase the pressure to the necessary braking fluid pressure. Then, if the judgment is "YES", the procedure advances to Step S712, and, as the second phase, goes to a state of adjusting the pressure, that is, a stated in which the pressure of the braking fluid is kept or increased or reduced in accordance with the current state. If the judgment is "NO", then the procedure returns, and the pressurizing is continued.

On the other hand, if the procedure has advanced to Step S74 in case of understeer control, then first, at Step S74, the braking fluid is pressurized with a pressurizing speed at the mechanical limit. Then, Step S75 judges whether a predetermined period of time T3 has elapsed after starting to pressurize the braking fluid. If the judgment is "YES", then the procedure advances to Step S76, and if it is "NO", then the pressurizing is continued at a pressurizing speed at the mechanical limit until the predetermined period of time T3 has elapsed after starting to pressurize the braking fluid. On the other hand, at Step S76, the braking fluid is pressurized for example at a speed of (pressurizing speed at mechanical limit×0.8).

This control of the braking fluid pressure is to avoid rocking of the wheels, since the tires do not have gripping power during an understeering tendency. That is to say, by first pressurizing the braking fluid with a pressurizing speed at the mechanical limit, the lagging of the braking fluid pressure with respect to the posture control, like break pads adhering on the disk rotor, is rectified. Then, the pressurizing speed is somewhat reduced and the pressurizing is continued. Thus, it can be avoided that an excessive braking fluid pressure is applied so that the wheels rocks.

Step S713 judges whether the slip ratio has at least a predetermined value. If the judgment is "NO", then the procedure advances to Step S714, which judges whether actual yaw rate $\phi$ is following the turning operation of the steering wheel. If the judgment is "NO", then the procedure returns and the pressurizing is continued, because the effect of the posture control does not manifest itself.

On the other hand, if at either of Step S713 and Step S714 the judgment is "YES", then the procedure advances to Step S715, which judges whether a predetermined period of time T5 has elapsed after starting to pressurize the braking fluid. If the judgment is "YES", then the procedure advances to Step S716, and goes to a pressure adjustment state. If the judgment is "NO", then the pressurizing should be continued and the procedure returns.

By controlling the braking fluid pressure in this manner without performing a feedback control, it is easy to achieve a braking fluid pressure control system.

Moreover, by first pressurizing the braking fluid with a pressurizing speed at the mechanical limit or at a pressurizing speed lower than the mechanical limit (first phase), the braking power is applied early, so that a quick posture control can be achieved. In addition, when the vehicle posture goes into convergence direction, switching to pressure adjustment control of the braking fluid pressure (second phase) makes it possible to achieve precise posture control without the control amount becoming excessive.

In particular, in the case that the intervention of the first oversteer control and the first understeer control is delayed as much as possible as in this embodiment, the driver will rarely feel awkward when the braking fluid pressure is controlled in this manner. Furthermore, this control of the braking fluid pressure is extremely useful in that quick posture control becomes possible.

Control of the Warning Apparatus

Referring to the flowchart of FIG. 16, the following explains the control of the warning apparatus 38. The start of the operation of the warning apparatus 38 is delayed after the start of the posture control (behavior control), and also the end of the operation of the warning apparatus 38 is delayed after the end of the behavior control.

First, Step S81 judges whether a flag F is 1 or not. As explained below, this flag F is 1 when behavior control of the vehicle is being performed. Then, if the judgment is "YES", the procedure advances to Step S87, and if it is "NO", then the control of the operation start of the warning apparatus should be performed and the procedure advances to Step S82.

Step S82 judges whether behavior control is currently being performed. If the judgment is "YES", then the procedure advances to Step S83, and if it is "NO", then the procedure returns.

Step S83 judges whether the estimated braking fluid pressure has at least a predetermined value. If the judgment is "YES", then the procedure advances to Step S84, and if it is "NO", then the procedure advances to Step S85.

Step S85 judges whether a predetermined period of time has elapsed after the start of the behavior control. If the judgment is "YES", then the procedure advances to Step S84, and if it is "NO", then the procedure returns.

At Step S84, the flag F is set to 1 and the procedure returns to Step S86, the warning apparatus is activated (warning ON), and the procedure returns.

Thus, the begin of the operation of the warning apparatus is delayed after the begin of the behavior control, until for example the estimated brake pressure has reached at least a predetermined value or until the behavior control has been carried out for at least a predetermined time. This prevents that the warning apparatus is operated even though the driver has not noticed the intervention of behavior control, so that an awkward feeling of the driver as well as operational mistakes caused by this awkward feeling can be prevented.

The above-described Steps S82 to S86 constitute the control related to the operation start of the warning apparatus 38, whereas the control performed if the judgment at Step S81 is "YES" is related to the ending of the operation of the warning apparatus 38.

First, Step S87 judges whether the vehicle is traveling straight forward and is in a stable state. If this judgment is "NO", then the procedure advances to Step S88.

Step S88 judges whether a predetermined period of time has elapsed after the behavior control has been terminated. If the judgment is "NO", then the procedure advances to Step S89.

Step S89 judges whether the braking fluid pressure (brake pressure) is substantially the same as the pressure in the master cylinder, that is to say, whether the braking fluid pressure is at atmospheric pressure when for example the driver is not depressing the brake pedal, or conversely whether the braking fluid pressure is at the pressure of the master cylinder, in correspondence to the depressing amount of the brake pedal, when the driver is depressing the brake pedal. If the judgment is "NO", then the procedure returns.

If the judgment at any of Step S83, Step S88 and Step S89 is "YES", then the procedure advances to Step S810, the flag F is set to 0, the operation of the warning apparatus 38 is terminated at Step S811, and the procedure returns.

Thus, by terminating the operation of the warning apparatus 38 after a predetermined period of time has elapsed after the termination of the behavior control, the warning is performed continuously without repeatedly terminating and starting the warning when a behavior control is carried out intermittently, for example to avoid an obstacle. Thus, it is possible to prevent an awkward feeling of the driver.

Furthermore, by continuing the operation of the warning apparatus 38 after terminating the behavior control until the driving environment of the vehicle changes, for example when the vehicle stabilizes in a state of traveling straight forward, or when the brake pressure fluid substantially matches the pressure in the master cylinder, it can be prevented that the warning is repeatedly terminated and started. As a result, a suitable warning can be achieved without the driver feeling awkward.

Other Embodiments

It should be noted that the present invention is not limited to the above-described embodiment, and a variety of other embodiments are included in the present invention. For example, in the above embodiment, in the setting of the threshold THUS of the first understeer control (see FIG. 9) if the second target yaw rate φ (G) decreases below a predetermined value during cornering, the threshold is decreased (see FIG. 9, Step S46). However, it is also possible to forcibly intervene with the first understeer control in a case corresponding to the above conditions without amending the threshold THUS, and to begin the control.

Furthermore, in the above-described embodiment, in the setting of the threshold THOS for the first oversteer control (see FIG. 10), the threshold is set low in the case of tuck-in (see FIG. 10, Step S57), but different from that, it is also possible to forcibly intervene with the first oversteer control in the case of tuck-in, and start the control. That is to say, in Step S19 in FIG. 2, it is also possible to judge whether the yaw rate deviation Δφ (θ, G) has exceeded the threshold or whether there is tuck-in.

Moreover, in the above-described embodiment, in the case of counter-steering, the first intervention threshold THOS is lowered (see Step S57 in FIG. 10), but different from that, it is also possible to forcibly intervene with the first oversteer control in the case of counter-steering, as in the case of tuck-in, and to start the control.

In addition, if the first target yaw rate φ (θ) has become smaller than the second target yaw rate φ (G), for example when the driver has counter-steered during an oversteering tendency (see FIG. 7), then, in the above embodiment, the control target yaw rate Trφ is changed from the second to the first target yaw rate at the time when the first target yaw rate φ (θ) has become smaller than the second target yaw rate φ (G). However, different from that, it is also possible to perform the control for example as follows.

When the control target yaw rate Trφ has been changed from the second target yaw rate φ (G) to the first target yaw rate φ (θ), there is also the risk that the brake pressure changes abruptly. Therefore, when it is predicted, based on the fact that the steering angle has reversed, that the absolute value of the first target yaw rate φ (θ) becomes smaller than the second target yaw rate φ (G), then it is also possible to relax the control amount, so that the control target yaw rate Trφ does not change abruptly. That is to say, the control operation is relaxed when the control target yaw rate Trφ has been switched form the second target yaw rate φ (G) to the first target yaw rate φ (θ).

An example of a means for relaxing the control operation is previously setting an upper limit of the brake pressure and making sure that the brake pressure does not exceed this upper limit even when the control target yaw rate Trφ has been changed from the second target yaw rate φ (G) to the first target yaw rate φ (θ). Another example of a means for relaxing the control operation is setting the control target yaw rate Trφ by adding, as an amendment of the control target yaw rate Trφ, the derivative of the first target yaw rate φ (θ) to the second target yaw rate φ (G) when it is predicted that the first target yaw rate φ (θ) becomes smaller than the second target yaw rate φ (G). When this is done, then the control operation is relaxed when switching the control target yaw rate Trφ, and the shock due to the switching can be reduced.

Furthermore, in the above-described embodiment, the control target yaw rate Trφ is set to the first or second target yaw rate φ (θ, G) that has the smaller absolute value. But different from that, it is also possible that when the yaw rate variations are extremely high, such as when driving on a poor road, the control target yaw rate Trφ is set to the first target yaw rate φ (θ) even though the absolute value of the second target yaw rate φ (G) is smaller than the absolute value of the first target yaw rate φ (θ). This is because if the yaw rate variations are extremely high, the variations of the lateral acceleration are very high, and there is the risk that the second target yaw rate φ (G) is not suitable as the control target yaw rate Trφ. Therefore, if the yaw rate variations are extremely high, it is also possible to take the first target yaw rate φ (θ) based on the steering angle, which takes on a stable value, as the control target yaw rate Trφ.

Moreover, if the yaw rate variations are extremely high, it is also possible to use the following equation instead of the afore-mentioned Equation (3) as the equation for amending the control target yaw rate Trφ.

$$Tr\phi = (1-k2) \times \phi(G) + k2 \times \phi(\theta) \qquad (4)$$

That is to say, the control target yaw rate Trφ is set to the second target yaw rate φ (G) plus an amendment value that is proportional to the difference between the first target yaw rate φ (θ) and the second target yaw rate φ (G) When k2 is large, the amendment ratio of the first target yaw rate φ (θ) becomes large, and it becomes possible to perform a suitable posture control even when the yaw rate variations are extremely large.

Furthermore, in the above-described embodiment, a condition for starting the operation of the warning apparatus 38 is that the estimated braking fluid pressure has at least a predetermined value (Step S83 in FIG. 16). In addition to this condition, it is also possible to let the warning apparatus 38 operate when for example the decrease of the engine output has at least a predetermined value.

Furthermore, the above-mentioned embodiment includes, as oversteer controls, a second and a third oversteer control in addition to the first oversteer control. However, the present invention is not limited to this, and it is also possible to provide only the first oversteer control and either one of the third and the second oversteer control.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A vehicle posture control apparatus which controls posture of a vehicle in a yawing direction by independently controlling brakes of the vehicle's wheels, comprising:

first judging means for judging whether an understeering tendency of the vehicle is stronger than a preset reference value;

second judging means for judging whether a steering wheel is turned from a situation in which the vehicle is moving straight forward;

third judging means for judging whether a deviation between a change rate of a steering wheel angle and a change rate of an actual yaw rate is in an increasing tendency; and control means for independently controlling the brakes of the wheels of the vehicle in accordance with results of the judgment by the first, second and third judging means;

wherein the control means controls, when the first judging means judges that an understeering tendency of the vehicle is stronger than the preset reference value during the vehicle is cornering, the brakes of the wheels of the vehicle independently to suppress the understeering tendency; and wherein when the third judging means judges that a deviation between the change rate of the steering wheel angle and the change rate of the actual yaw rate is in an increasing tendency at a beginning of cornering of the vehicle when the second judging means judge that the steering wheel is tuned from a situation in which the vehicle is moving straight forward, the control means controls the brakes of the wheels of the vehicle independently to suppress the increasing tendency of the deviation with an amount less than a control amount for suppressing the understeering tendency during the cornering of the vehicle in accordance with a result of judgment of the first judging means, regardless of the result of judgment by the first judging means.

2. The vehicle posture control apparatus according to claim 1, wherein when the third judging means judges that a deviation between the change rate of the steering wheel angle and the change rate of the actual yaw rate is in an increasing tendency at a beginning of cornering of the vehicle when the second judging means judges that the steering wheel is turned from a situation in which the vehicle is moving straight forward, the control means supplies a brake pressure with an upper limit set lower than maximum brake pressure that can be supplied for suppressing the understeering tendency during the cornering of the vehicle in accordance with a result of judgment by the first judging means.

3. The vehicle posture control apparatus according to claim 1, wherein after brake control of the wheels of the vehicle starts in accordance with results of judgment by the second and third judging means to suppress an increasing tendency of the deviation between the change rate of the steering wheel angle and the change of the actual yaw rate and the deviation switched to a decreasing tendency, the control means stops the brake control.

4. The vehicle posture control apparatus according to claim 1, wherein the control means controls, when an understeering tendency stronger than the preset reference value is suppressed during cornering of the vehicle in accordance with a result of judgment by the first and third judging means, the brake of cornering inside rear wheel, and the control means controls, when an increasing tendency of a deviation between the change rate of the steering wheel angle and the change rate of the actual yaw is suppressed at a beginning of cornering of vehicle in accordance with results of judgment by the second and third judging means, the brake of cornering inside front wheel.

5. The vehicle posture control apparatus according to claim 1, wherein the control means stops brake control of the wheels of the vehicle for suppressing an increasing tendency of a deviation between the change rate of the steering wheel angle and the change rate of the actual yaw rate at a beginning of cornering of the vehicle, regardless of results of judgment by the second and third judging means when the vehicle is in an oversteering tendency stronger than the preset reference value.

6. The vehicle posture control apparatus according to claim 1, wherein the first judging means judges an understeering tendency of the vehicle based on an amount of a deviation between a target yaw rate set based on a lateral acceleration of the vehicle and the actual yaw rate.

7. A vehicle posture control apparatus which controls posture of a vehicle in a yawing direction of the vehicle by independently controlling brakes of the wheels of the vehicle comprising:

a lateral acceleration sensor for detecting a lateral acceleration of the vehicle;

a yaw rate sensor for detecting a yaw rate generated in the vehicle;

a steering angle sensor for detecting a steering angle of a steering wheel off the vehicle;

solenoid valves for exchanging brake pressure of the brakes of the wheels between supply and discharge, respectively; and a controller which receives detecting signals of the lateral acceleration sensor, the yaw rate sensor and the steering angle sensor to control the solenoid valves according to the detection signals, wherein the controller is configurated to;

judge whether an understeering tendency of the vehicle is stronger than a preset reference value;

judge whether the steering wheel is turned from a situation in which vehicle is moving straight forward;

judge whether a deviation between a change rate of a steering wheel angle and a change rate of an actual yaw rate is in an increasing tendency;

control, when it is judged that an understeering tendency of the vehicle is stronger than the preset reference value during cornering of the vehicle, the solenoid valves to suppress the understeering tendency; and control, when it is judged that the deviation between the change rate of the steering wheel angle and the change rate of the actual yaw rate is in an increasing tendency at a beginning of cornering of the vehicle when it is judged that the steering wheel is turned from a situation in which the vehicle is moving straight forward, the solenoid valves so as to supply to the brakes of the cornering inside wheels a brake pressure lower than that for suppressing the understeering tendency during cornering of the vehicle, regardless of the amount of the understeering tendency.

* * * * *